United States Patent
Ashida et al.

(10) Patent No.: US 12,075,171 B2
(45) Date of Patent: Aug. 27, 2024

(54) PHOTOELECTRIC CONVERSION APPARATUS, PHOTOELECTRIC CONVERSION SYSTEM, TRANSPORT APPARATUS, AND SIGNAL PROCESSING APPARATUS

(71) Applicant: CANON KABUSHIKI KAISHA, Tokyo (JP)

(72) Inventors: Jumpei Ashida, Kanagawa (JP); Keisuke Takahashi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 259 days.

(21) Appl. No.: 17/837,245

(22) Filed: Jun. 10, 2022

(65) Prior Publication Data
US 2022/0408036 A1 Dec. 22, 2022

(30) Foreign Application Priority Data
Jun. 17, 2021 (JP) .................... 2021-101025

(51) Int. Cl.
*H04N 25/42* (2023.01)
*H04N 25/63* (2023.01)
(Continued)

(52) U.S. Cl.
CPC ............ *H04N 25/42* (2023.01); *H04N 25/63* (2023.01); *H04N 25/633* (2023.01); *H04N 25/75* (2023.01)

(58) Field of Classification Search
CPC ...... H04N 25/42; H04N 25/63; H04N 25/633; H04N 25/75; H04N 25/704
See application file for complete search history.

(56) References Cited

U.S. PATENT DOCUMENTS 11,070,755 B2   7/2021  Takahashi
11,523,074 B2 * 12/2022  Asakura ............... H04N 25/445
(Continued)

FOREIGN PATENT DOCUMENTS

JP   2015-002400 A   1/2015
JP   2017-142484 A   8/2017
(Continued)

OTHER PUBLICATIONS

Office Action dated Jul. 21, 2023, in Japanese Patent Application No. 2021-101025.
(Continued)

*Primary Examiner* — Nicholas G Giles
(74) *Attorney, Agent, or Firm* — Venable LLP

(57) ABSTRACT

A photoelectric conversion apparatus comprising a pixel array and a signal processor is provided. The pixel array is configured to be operable in driving modes in which different signal readout methods are used. The signal processor comprises a selector configured to select, based on the driving mode set for each pixel among the driving modes, a first pixel group and a second pixel group from regions of the pixel array, which have been designated to generate a correction value, a correction value generator configured to generate the correction value in accordance with a first representative value based on signals read out from the first pixel group and a second representative value based on signals read out from the second pixel group, and a corrector configured to correct, based on the correction value, the signal read out from the pixel array.

14 Claims, 13 Drawing Sheets

(51) Int. Cl.
*H04N 25/633* (2023.01)
*H04N 25/75* (2023.01)

(56) References Cited

U.S. PATENT DOCUMENTS

2020/0314370 A1  10/2020  Takahashi
2022/0060643 A1*  2/2022  Asakura ................ H04N 23/60

FOREIGN PATENT DOCUMENTS

| JP | 2018-019139 A | 2/2018 |
| JP | 2018-160740 A | 10/2018 |
| JP | 2020-167542 A | 10/2020 |

OTHER PUBLICATIONS

Office Action dated Mar. 3, 2023, in Japanese Patent Application No. 2021-101025.

* cited by examiner

FIG. 11A

| | | |
|---|---|---|
| REGION Pos | POSITION SETTING | VOB PIXEL REGION |
| | FLAG SETTING | FOR CAPTURED IMAGE |
| | PATTERN SETTING | INVALID |
| REGION Neg | POSITION SETTING | VOB PIXEL REGION |
| | FLAG SETTING | FOR FOCUS DETECTION |
| | PATTERN SETTING | INVALID |
| REGION Cor | POSITION SETTING | LIGHT-RECEIVING PIXEL REGION |
| | FLAG SETTING | FOR FOCUS DETECTION |
| | PATTERN SETTING | INVALID |
| CORRECTION VALUE | | SELECT CURRENT FRAME |

FIG. 11B

| | | |
|---|---|---|
| REGION Pos | POSITION SETTING | HOB PIXEL REGION |
| | FLAG SETTING | FOR CAPTURED IMAGE |
| | PATTERN SETTING | INVALID |
| REGION Neg | POSITION SETTING | HOB PIXEL REGION |
| | FLAG SETTING | FOR FOCUS DETECTION |
| | PATTERN SETTING | INVALID |
| REGION Cor | POSITION SETTING | ENTIRE PIXEL ARRAY |
| | FLAG SETTING | FOR FOCUS DETECTION |
| | PATTERN SETTING | INVALID |
| CORRECTION VALUE | | SELECT PREVIOUS FRAME |

PHOTOELECTRIC CONVERSION APPARATUS, PHOTOELECTRIC CONVERSION SYSTEM, TRANSPORT APPARATUS, AND SIGNAL PROCESSING APPARATUS

BACKGROUND OF THE INVENTION

Field of the Invention

The present invention relates to a photoelectric conversion apparatus, a photoelectric conversion system, a transport apparatus, and a signal processing apparatus.

Description of the Related Art

In recent years, the multi-functionality of image capturing apparatuses mounted on an image capturing system such as a digital still camera or a digital video camera is advancing. Japanese Patent Laid-Open No. 2020-167542 describes an image capturing apparatus that can drive pixels in a different mode depending on a pixel row when reading out signals, and output focus detection data in addition to captured image data.

SUMMARY OF THE INVENTION

If each pixel is driven in a different mode depending on the pixel when reading out a signal from a pixel array, a correction amount used to perform correction processing for the read signal may be different for each driving mode. Correction processing that can cope with the various driving modes is desired.

Some embodiments of the present invention provide a technique advantageous in improving the accuracy of correction processing.

According to some embodiments, a photoelectric conversion apparatus comprising a pixel array in which a plurality of pixels are arranged in a matrix, and a signal processor configured to process a signal read out from the pixel array, wherein the plurality of pixels are configured to be operable in a plurality of driving modes in which different signal readout methods are used, and the signal processor comprises: a selecting circuit configured to select, based on the driving mode set for each pixel among the plurality of driving modes, a first pixel group and a second pixel group among the plurality of pixels from regions of the pixel array, which have been designated to generate a correction value; a correction value generation circuit configured to generate the correction value in accordance with a first representative value based on signals read out from the first pixel group and a second representative value based on signals read out from the second pixel group; and a correcting circuit configured to correct, based on the correction value, the signal read out from the pixel array, is provided.

According to some other embodiments, a signal processing apparatus for processing a signal read out from a pixel array in which a plurality of pixels operable in a plurality of driving modes in which different signal readout methods are used are arranged in a matrix, comprising: a selecting circuit configured to select, based on the driving mode set for each pixel among the plurality of driving modes, a first pixel group and a second pixel group among the plurality of pixels from regions of the pixel array of the plurality of pixels, which have been designated to generate a correction value; a correction value generation circuit configured to generate the correction value in accordance with a first representative value based on signals read out from the first pixel group and a second representative value based on signals read out from the second pixel group; and a correcting circuit configured to correct, based on the correction value, the signal read out from the pixel array, is provided.

Further features of the present invention will become apparent from the following description of exemplary embodiments (with reference to the attached drawings).

BRIEF DESCRIPTION OF THE DRAWINGS

FIGS. 11A and 11B are tables each showing a setting example of correction processing of the photoelectric conversion apparatus shown in FIG. 1;

DESCRIPTION OF THE EMBODIMENTS

Figure 1:
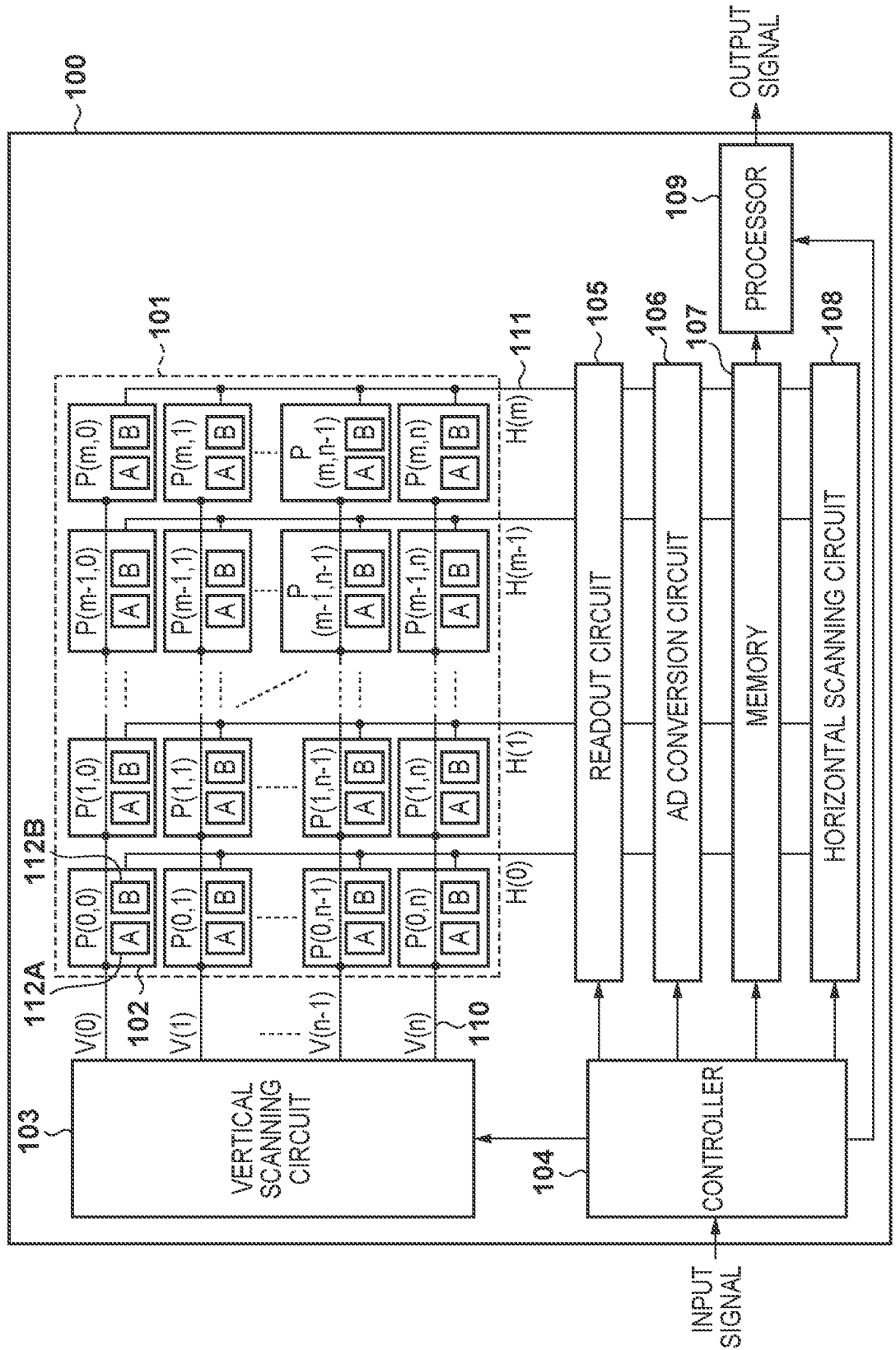
FIG. 1 is a block diagram showing an example of the arrangement of a photoelectric conversion apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 2:
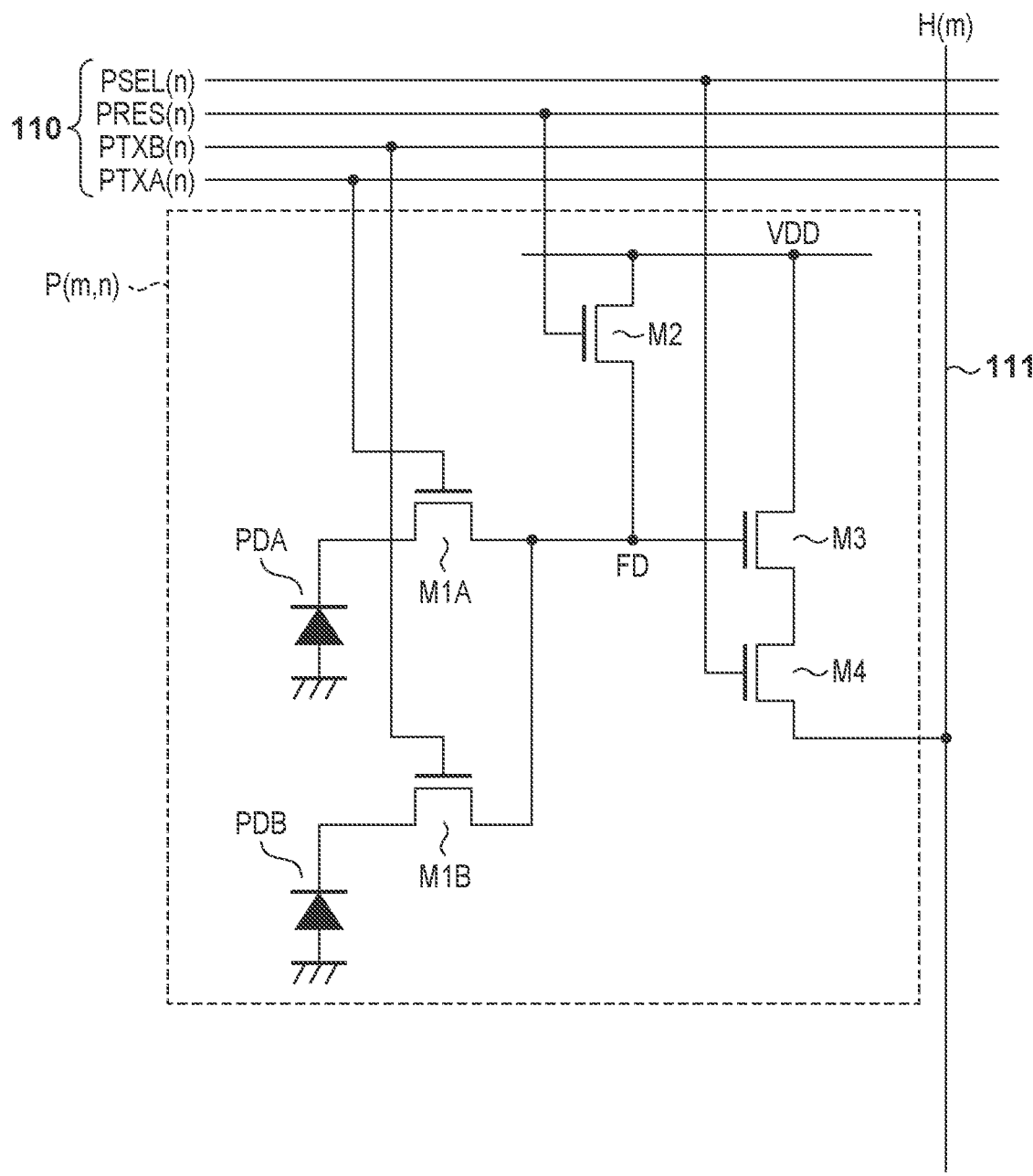
FIG. 2 is a circuit diagram showing an example of the arrangement of a pixel of the photoelectric conversion apparatus shown in FIG. 1.

A photoelectric conversion apparatus according to an embodiment of the present invention will be described with reference to FIGS. 1 to 15B. First, the structure of a photoelectric conversion apparatus according to this embodiment will be described with reference to FIGS. 1 and 2. FIG. 1 is a block diagram showing the schematic arrangement of a photoelectric conversion apparatus 100 according to this embodiment. FIG. 2 is a circuit diagram showing an example of the arrangement of a pixel 102 of the photoelectric conversion apparatus 100. As shown in FIG. 1, the photoelectric conversion apparatus 100 includes a pixel array 101, a vertical scanning circuit 103, a controller 104, a readout circuit 105, an AD conversion circuit 106, a memory 107, a horizontal scanning circuit 108, and a processor 109.

In the pixel array 101, the plurality of pixels 102 are arranged in a matrix of a plurality of rows and a plurality of columns. FIG. 1 shows the pixel array 101 including the pixels 102 arrayed in (m+1) columns of the 0th column to the mth column×(n+1) rows of the 0th row to the nth row. For each pixel 102, a code P(m, n) obtained by adding, to a code P, coordinates representing the corresponding column and row numbers is described. Each pixel 102 includes a plurality of photoelectric converters. More specifically, in this embodiment, each pixel 102 includes two photoelectric converters 112A and 112B. The photoelectric conversion apparatus 100 can detect a phase difference by comparing a signal output from the photoelectric converter 112A with a signal output from the photoelectric converter 112B. Each pixel 102 includes the two photoelectric converters 112A and 112B in this embodiment but may include three or more photoelectric converters 112.

In the pixel array 101, a row selection line 110 is arranged for each row. Each row selection line 110 is connected to the (m+1) pixels 102 arranged in the corresponding row. The row selection lines 110 are connected to the vertical scanning circuit 103.

In the pixel array 101, a vertical output line 111 is arranged for each column. Each vertical output line 111 is connected to the (n+1) pixels 102 arranged in the corresponding column. The vertical output lines 111 are connected to the readout circuit 105.

The vertical scanning circuit 103 is a control circuit for performing an operation (vertical scanning) of giving a driving signal to the pixels 102 of the pixel array 101 on the row basis. In the row selected by the vertical scanning circuit 103, signals are simultaneously output from the (m+1) pixels 102 included in the selected row via the corresponding vertical output lines 111, respectively. The signals (analog signals) output on the row basis from the pixel array 101 are input to the readout circuit 105.

The readout circuit 105 is a circuit that performs predetermined processing for the analog signals read out from the pixel array 101. The readout circuit 105 can include a plurality of amplification circuits and a plurality of signal storage circuits respectively corresponding to the columns (vertical output lines 111) of the pixel array 101. For example, the readout circuit 105 amplifies, by the amplification circuit of the corresponding column, the analog signal output from the vertical output line 111 of each column of the pixel array 101, and stores the amplified signal in the signal storage circuit of the corresponding column.

The AD conversion circuit 106 is a circuit that converts the signal of each column output from the readout circuit 105 from the analog signal into a digital signal. The memory 107 is a signal storage circuit that temporarily stores the digital signal of each column, which has been AD-converted by the AD conversion circuit 106.

The horizontal scanning circuit 108 is a circuit that supplies, to the memory 107, a control signal for outputting, to the processor 109, the digital pixel signal stored in the column memory of each column of the memory 107. That is, the digital signal stored in the column memory of the column for which address designation has been performed by the horizontal scanning circuit 108 is sequentially read out from the memory 107, and transferred to the processor 109.

The processor 109 performs predetermined processing for the digital signal read out from the memory 107. The processing performed by the processor 109 includes CDS (Correlated Double Sampling) processing and correction processing (to be described later). Furthermore, the processor 109 includes an external interface such as LVDS (Low Voltage Differential Signaling), and outputs the processed digital signal to the outside of the photoelectric conversion apparatus 100.

The controller 104 (to also be referred to as a timing generator hereinafter) is a control circuit that supplies control signals for controlling operations and their timings to the vertical scanning circuit 103, the readout circuit 105, the AD conversion circuit 106, the memory 107, the horizontal scanning circuit 108, and the processor 109. At least some of these control signals may be supplied from the outside of the photoelectric conversion apparatus 100. Furthermore, the controller 104 can be provided with setting information of the photoelectric conversion apparatus 100 by communication from the outside. In this case, the controller 104 controls the vertical scanning circuit 103, the readout circuit 105, the AD conversion circuit 106, the memory 107, the horizontal scanning circuit 108, and the processor 109 based on the setting information input from the outside. The function of the controller 104 may be implemented when a CPU or MPU reads out a program and executes it, or may be implemented by a circuit for implementing the function of an ASIC, an FPGA, or the like.

A signal obtained from the photoelectric converter 112A, that is, a signal corresponding to charges generated by the photoelectric converter 112A will be referred to as an A image signal hereinafter. A signal obtained from the photoelectric converter 112B, that is, a signal corresponding to charges generated by the photoelectric converter 112B will be referred to as a B image signal hereinafter. The A image signal and the B image signal can be used as, for example, focus detection signals. A signal obtained by compositing the A image signal and the B image signal, that is, a signal corresponding to charges obtained by compositing the charges generated by the photoelectric converter 112A and the charges generated by the photoelectric converter 112B will be referred to as an A+B image signal hereinafter. The A+B image signal can be used as, for example, a captured image signal.

Among the plurality of rows forming the pixel array 101, the row including the pixels 102 from which A image signals and A+B image signals are read out will be referred to as a focus detection data row hereinafter. Among the plurality of rows forming the pixel array 101, the row including the pixels 102 from which only A+B image signals are read out will be referred to as a captured image data row hereinafter.

In the photoelectric conversion apparatus 100 according to this embodiment, the focus detection data row and the captured image data row are appropriately set in the pixel array 101 in accordance with image capturing parameters (image capturing condition) and the like.

Each pixel 102 can be formed by, for example, a circuit shown in FIG. 2. As shown in FIG. 2, each pixel 102 can include two photodiodes PDA and PDB, transfer transistors M1A and M1B, a reset transistor M2, an amplification transistor M3, and a selection transistor M4.

The two photodiodes PDA and PDB correspond to the above-described photoelectric converters 112A and 112B, respectively. The photodiodes PDA and PDB of one pixel 102 share one microlens (not shown), and are configured to receive light having passed through a pupil area different from the exit pupil of an imaging lens. This can use, as signals for focal length detection, a signal based on charges generated by the photodiode PDA and a signal based on charges generated by the photodiode PDB. In addition, a signal based on the total charges obtained by adding the charges generated by the photodiode PDA and the charges generated by the photodiode PDB can be used as a signal for image acquisition.

The photodiode PDA has an anode connected to a ground node (GND) and a cathode connected to the source of the transfer transistor M1A. The photodiode PDB has an anode connected to a ground node (GND) and a cathode connected to the source of the transfer transistor M1B. The drains of the transfer transistors M1A and M1B are connected to the source of the reset transistor M2 and the gate of the amplification transistor M3. The connection node of the drains of the transfer transistors M1A and M1B, the source of the reset transistor M2, and the gate of the amplification transistor M3 is a so-called floating diffusion FD. The floating diffusion FD includes a capacity component, and forms a charge-voltage converter by the capacity component while functioning as a charge storage. The drain of the reset transistor M2 and the drain of the amplification transistor M3 are connected to the power node (voltage VDD). The source of the amplification transistor M3 is connected to the drain of the selection transistor M4. The source of the selection transistor M4 is connected to the vertical output line 111. The source and drain at the two main terminals of a transistor may be changed in accordance with the conductive type of the transistor, the function of interest, or the like, and the above-described source and drain may be called by the reversed names.

The row selection line 110 of each row includes a signal line connected to the gate of the transfer transistor M1A, a signal line connected to the gate of the transfer transistor M1B, a signal line connected to the gate of the reset transistor M2, and a signal line connected to the gate of the selection transistor M4. The vertical scanning circuit 103 supplies a control signal PTXA to the signal line connected to the gate of the transfer transistor M1A. The vertical scanning circuit 103 supplies a control signal PTXB to the signal line connected to the gate of the transfer transistor M1B. The vertical scanning circuit 103 supplies a control signal PRES to the signal line connected to the gate of the reset transistor M2. The vertical scanning circuit 103 supplies a control signal PSEL to the signal line connected to the gate of the selection transistor M4. If each transistor is formed by an N-type transistor, the corresponding transistor is turned on (set in a conductive state) when the vertical scanning circuit 103 supplies a control signal of high level, and is turned off (set in a non-conductive state) when the vertical scanning circuit 103 supplies a control signal of low level.

If light enters the pixel array 101, each of the photodiodes PDA and PDB of each pixel 102 generates (photoelectrically converts) charges of an amount corresponding to the light amount of the incident light, and accumulates the generated charges. The transfer transistors M1A and M1B transfer the charges of the photodiodes PDA and PDB to the floating diffusion FD, respectively, by performing an ON operation. The floating diffusion FD stores the charges transferred from each of the photodiodes PDA and PDB. When reading out the A image signal, the charges photoelectrically converted by the photodiode PDA are transferred to the floating diffusion FD via the transfer transistor M1A. When reading out the B image signal, the charges photoelectrically converted by the photodiode PDB are transferred to the floating diffusion FD via the transfer transistor M1B. When reading out the A+B image signal, the total charges photoelectrically converted by the photodiodes PDA and PDB are transferred to the floating diffusion FD via the transfer transistors M1A and M1B. This sets the floating diffusion FD to a voltage corresponding to the amount of charges transferred from the photodiodes PDA and PDB by charge-voltage conversion by the capacity component.

The amplification transistor M3 is configured so that the voltage VDD is supplied to the drain and a bias current is supplied from a current source (not shown) to the source via the selection transistor M4, and forms an amplifier (source follower circuit) having a gate as an input node. This causes the amplification transistor M3 to output, to the vertical output line 111 via the selection transistor M4, a signal based on the voltage of the floating diffusion FD. The reset transistor M2 resets the floating diffusion FD to a voltage corresponding to the voltage VDD by performing an ON operation.

The transfer transistors M1A and M1B, the reset transistors M2, and the selection transistors M4 of the pixels 102 are controlled on the row basis by the control signals PTXA, PTXB, PRES, and PSEL supplied from the vertical scanning circuit 103. The pixel signals of the plurality of pixels 102 connected to the row (selected row) selected by the control signal PSEL are simultaneously output to the vertical output lines 111 of the respective columns.

Figure 3:
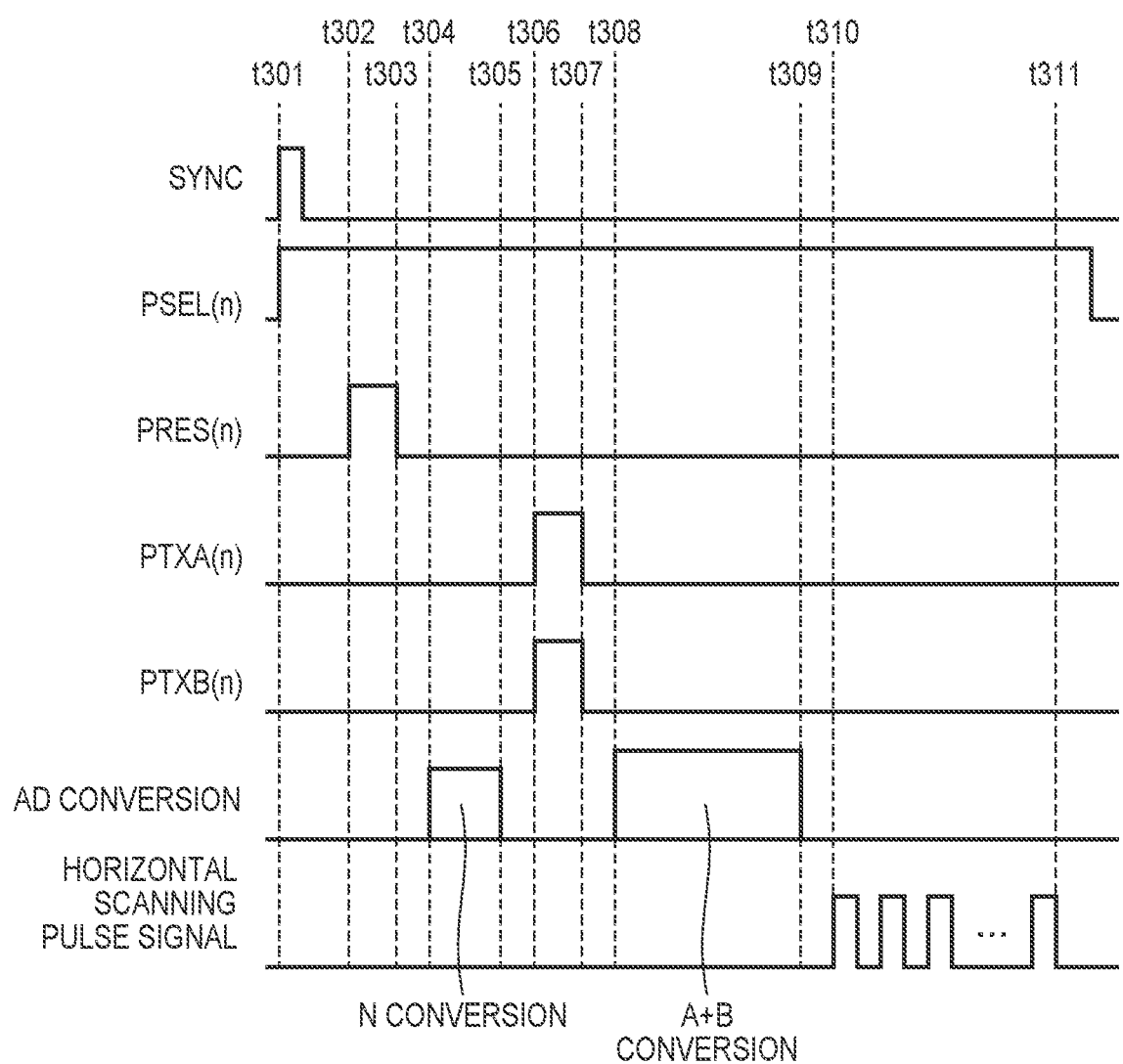
FIG. 3 is a timing chart showing an example of the readout operation of the photoelectric conversion apparatus shown in FIG. 1.
Figure 4:
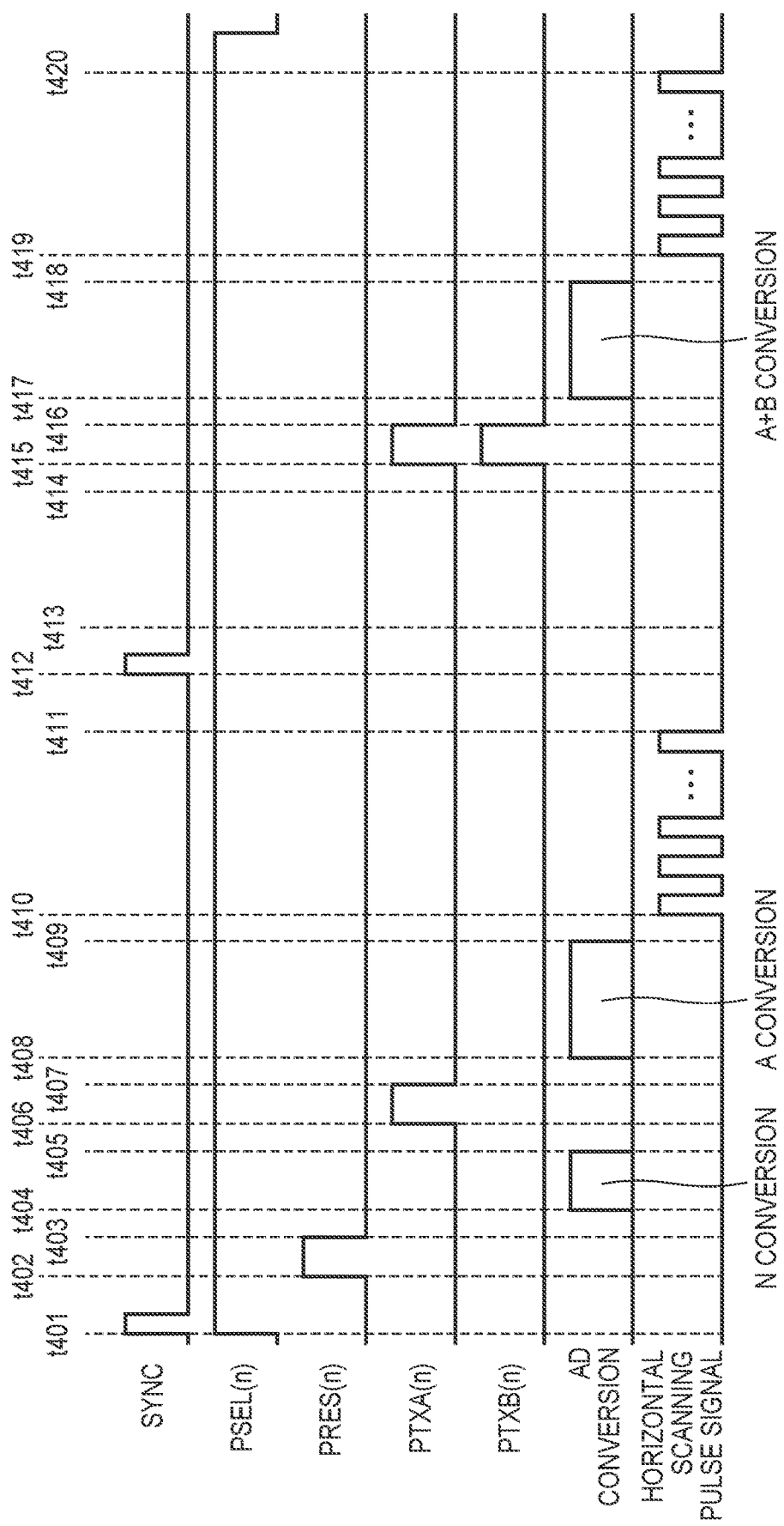
FIG. 4 is a timing chart showing an example of the readout operation of the photoelectric conversion apparatus shown in FIG. 1.

The operation of the pixel array 101 of an image capturing apparatus according to this embodiment will be described next with reference to FIGS. 3 and 4. FIG. 3 is a timing chart when signals are read out from the pixels 102 belonging to the captured image data row. FIG. 4 is a timing chart when signals are read out from the pixels 102 belonging to the focus detection data row. FIGS. 3 and 4 each show, as an example, a readout operation when the pixels 102 of the nth row are selected by the vertical scanning circuit 103. As described above, each transistor of each pixel 102 is turned on when the vertical scanning circuit 103 supplies a control signal of high level, and is turned off when the vertical scanning circuit 103 supplies a control signal of low level.

The readout operation for the captured image data row will be described with reference to FIG. 3. FIG. 3 shows a horizontal synchronization signal SYNC, control signals PSEL(n), PRES(n), PTXA(n), and PTXB(n), an AD conversion period, and a horizontal scanning pulse signal. Data is read out from the captured image data row in a driving mode of reading out an A+B image signal corresponding to charges obtained by compositing charges generated by the photodiodes PDA and PDB. On the other hand, in reading out the data from the captured image data row, a driving mode of reading out an A image signal corresponding to the charges generated by only the photodiode PDA or a B image signal corresponding to the charges generated by only the photodiode PDB is not performed.

At time t301, the horizontal synchronization signal SYNC supplied from the controller 104 to the vertical scanning circuit 103 transitions from low level to high level. When the horizontal synchronization signal SYNC rises, the vertical scanning circuit 103 controls the control signal PSEL(n) of the nth row from low level to high level. This turns on the selection transistor M4 of each pixel 102 belonging to the nth row, and each pixel 102 can output a signal to the vertical output line 111 via the selection transistor M4. That is, the nth row is selected by the control signal PSEL(n) from the vertical scanning circuit 103.

Next, at time t302, the vertical scanning circuit 103 controls the control signal PRES(n) of the selected row, that is, the nth row from low level to high level. This turns on the reset transistor M2 of each pixel 102 belonging to the nth row, and the floating diffusion FD is reset to a potential corresponding to the voltage VDD.

Subsequently, at time t303, the vertical scanning circuit 103 controls the control signal PRES(n) of the nth row from high level to low level. This turns off the reset transistor M2 of each pixel 102 belonging to the nth row, and reset of the floating diffusion FD is canceled. At this time, since the selection transistor M4 of each pixel 102 belonging to the nth row remains in the ON state, an output signal corresponding to the potential of the gate of the amplification transistor M3 when reset of the floating diffusion FD is canceled is output to the vertical output line 111. A pixel signal of a reset level output from each pixel 102 will be referred to as an N signal (noise signal) hereinafter.

Next, a period from time t304 to time t305 is a period during which AD conversion processing is performed for the N signal output to the vertical output line 111. The N signal output to the vertical output line 111 is read out by the readout circuit 105, and converted into a digital signal by the AD conversion circuit 106. The digital signal of the N signal obtained by the AD conversion circuit 106 is stored in the memory 107. The operation performed during the period from time t304 to time t305, that is, the operation of converting the N signal into the digital signal will be referred to as N conversion hereinafter.

Next, at time t306, the vertical scanning circuit 103 controls each of the control signals PTXA(n) and PTXB(n) of the nth row from low level to high level. This turns on the transfer transistors M1A and M1B of each pixel 102 belonging to the nth row, and the charges accumulated in the photodiodes PDA and PDB are transferred to the floating diffusion FD. This sets the potential of the floating diffusion FD, that is, the potential of the gate of the amplification transistor M3 to a potential corresponding to the amount of charges transferred from the photodiodes PDA and PDB. At this time, since the selection transistor M4 of each pixel 102 belonging to the nth row remains in the ON state, an A+B image signal as a signal corresponding to the total amount of charges generated by the photodiodes PDA and PDB is output to the vertical output line 111.

Subsequently, at time t307, the vertical scanning circuit 103 controls each of the control signals PTXA(n) and PTXB(n) of the nth row from high level to low level. This turns off the transfer transistors M1A and M1B of each pixel 102 belonging to the nth row. Even after the transfer transistors M1A and M1B are turned off, the A+B image signal is continuously output to the vertical output line 111.

Next, a period from time t308 to time t309 is a period during which AD conversion processing is performed for the A+B image signal output to the vertical output line 111. The A+B image signal output to the vertical output line 111 is read out by the readout circuit 105, and converted into a digital signal by the AD conversion circuit 106. The digital signal of the A+B image signal obtained by the AD conversion circuit 106 is stored in a memory area of the memory 107 different from a memory area where the N signal is stored. The operation performed during the period from time t308 to time t309, that is, the operation of converting the A+B image signal into the digital signal will be referred to as A+B conversion hereinafter.

A period from time t310 to time t311 is a period during which the N signals and the A+B image signals stored in the memory 107 are transferred to the processor 109. The horizontal scanning circuit 108 outputs the horizontal scanning pulse signal to the memory 107. The memory 107 transfers, to the processor 109, the N signal and the A+B image signal corresponding to an address (column) selected by the horizontal scanning pulse signal. When this operation is repeatedly performed (horizontal scanning is performed) from the 0th column to the mth column while changing the address selected by the horizontal scanning pulse signal, the N signals and the A+B image signals for one row as a readout target row can be read out. The processor 109 performs processing of subtracting, from the A+B image signal, the N signal corresponding to the A+B image signal, thereby suppressing noise to be superimposed on the A+B image signal.

After that, the vertical scanning circuit 103 cancels selection of the nth row by controlling the control signal PSEL(n) of the nth row from high level to low level, completes the readout operation for one row of the captured image data row, and shifts to the readout operation of the next row.

Next, the readout operation for the focus detection data row will be described with reference to FIG. 4. FIG. 4 shows the horizontal synchronization signal SYNC, the control signals PSEL(n), PRES(n), PTXA(n), and PTXB(n), the AD conversion period, and the horizontal scanning pulse signal.

Data is read out from the focus detection data row in a driving mode of reading out an A image signal corresponding to charges generated by the photodiode PDA, and an A+B image signal corresponding to composite charges obtained by compositing charges generated by the photodiodes PDA and PDB.

At time t401, the horizontal synchronization signal SYNC supplied from the controller 104 to the vertical scanning circuit 103 transitions from low level to high level. When the horizontal synchronization signal SYNC rises, the vertical scanning circuit 103 controls the control signal PSEL(n) of the nth row from low level to high level. This turns on the selection transistor M4 of each pixel 102 belonging to the nth row, thereby selecting the nth row.

Next, at time t402, the vertical scanning circuit 103 controls the control signal PRES(n) of the nth row from low level to high level. This turns on the reset transistor M2 of each pixel 102 belonging to the nth row, and the floating diffusion FD is reset to a potential corresponding to the voltage VDD.

Subsequently, at time t403, the vertical scanning circuit 103 controls the control signal PRES(n) of the nth row from high level to low level. This turns off the reset transistor M2 of each pixel 102 belonging to the nth row, and reset of the floating diffusion FD is canceled. At this time, since the selection transistor M4 of each pixel 102 belonging to the nth row remains in the ON state, a pixel signal (N signal) of the reset level is output to the vertical output line 111.

Next, a period from time t404 to time t405 is a period during which AD conversion processing (N conversion) is performed for the N signal output to the vertical output line 111. The N signal output to the vertical output line 111 is read out by the readout circuit 105, and converted into a digital signal by the AD conversion circuit 106. The digital signal of the N signal obtained by the AD conversion circuit 106 is stored in the memory 107.

Next, at time t406, the vertical scanning circuit 103 controls the control signal PTXA(n) of the nth row from low level to high level. This turns on the transfer transistor M1A of each pixel 102 belonging to the nth row, and charges accumulated in the photodiode PDA are transferred to the floating diffusion FD. This sets the potential of the floating diffusion FD, that is, the potential of the gate of the amplification transistor M3 to a potential corresponding to the amount of charges transferred from the photodiode PDA. At this time, since the selection transistor M4 of each pixel 102 belonging to the nth row remains in the ON state, an A image signal as a pixel signal corresponding to the amount of charges generated by the photodiode PDA is output to the vertical output line 111.

Subsequently, at time t407, the vertical scanning circuit 103 controls the control signal PTXA(n) of the nth row from high level to low level. This turns off the transfer transistor M1A of each pixel 102 belonging to the nth row. Even after the transfer transistor M1A is turned off, the A image signal is continuously output to the vertical output line 111.

Next, a period from time t408 to time t409 is a period during which AD conversion processing is performed for the A image signal output to the vertical output line 111. The A image signal output to the vertical output line 111 is read out by the readout circuit 105, and converted into a digital signal by the AD conversion circuit 106. The digital signal of the A image signal obtained by the AD conversion circuit 106 is stored in a memory area of the memory 107 different from a memory area where the N signal is stored. The operation performed during the period from time t408 to time t409, that is, the operation of converting the A image signal into the digital signal will be referred to as A conversion hereinafter.

A period from time t410 to time t411 is a period during which the N signals and the A image signals stored in the memory 107 are transferred to the processor 109. The horizontal scanning circuit 108 outputs the horizontal scanning pulse signal to the memory 107. The memory 107 transfers, to the processor 109, the N signal and the A image signal corresponding to an address (column) selected by the horizontal scanning pulse signal. When this operation is repeatedly performed (horizontal scanning is performed) from the 0th column to the mth column while changing the address selected by the horizontal scanning pulse signal, the N signals and the A image signals for one row as a readout target row can be read out.

At time t412, the horizontal synchronization signal SYNC supplied from the controller 104 to the vertical scanning circuit 103 transitions from low level to high level again. At this time, the selection transistor M4 of each pixel 102 belonging to the nth row remains in the ON state, and the state in which the nth row is selected is maintained.

During a period from time t413 to time t414, the vertical scanning circuit 103 maintains the control signal PRES(n) of the nth row at low level. That is, during the period from time t413 to time t414, neither reset of the floating diffusion FD nor N conversion is performed. During a period from time t406 to time t415, the charges transferred from the photodiode PDA are stored in the floating diffusion FD.

Next, at time t415, the vertical scanning circuit 103 controls each of the control signals PTXA(n) and PTXB(n) of the nth row from low level to high level. This turns on the transfer transistors M1A and M1B of each pixel 102 belonging to the nth row, and charges accumulated in the photodiode PDB are transferred to the floating diffusion FD. This adds the charges transferred from the photodiode PDB to the charges transferred from the photodiode PDA in the floating diffusion FD. The potential of the floating diffusion FD, that is, the potential of the gate of the amplification transistor M3 is set to a potential corresponding to the total amount of charges transferred from the photodiodes PDA and PDB. At this time, since the selection transistor M4 of each pixel 102 belonging to the nth row remains in the ON state, an A+B image signal as a pixel signal corresponding to the total amount of charges generated by the photodiodes PDA and PDB is output to the vertical output line 111.

Next, at time t416, the vertical scanning circuit 103 controls each of the control signals PTXA(n) and PTXB(n) of the nth row from high level to low level. This turns off the transfer transistors M1A and M1B of each pixel 102 belonging to the nth row. Even after the transfer transistors M1A and M1B are turned off, the A+B image signal is continuously output to the vertical output line 111.

A period from time t417 to time t418 is a period during which AD conversion processing (A+B conversion) is performed for the A+B image signal output to the vertical output line 111. The A+B image signal output to the vertical output line 111 is read out by the readout circuit 105, and converted into a digital signal by the AD conversion circuit 106. The digital signal of the A+B image signal obtained by the AD conversion circuit 106 may be stored in the same memory area of the memory 107 as the memory area where the A image signal is stored.

A period from time t419 to time t420 is a period during which the N signals and the A+B image signals stored in the memory 107 are transferred to the processor 109. The horizontal scanning circuit 108 outputs the horizontal scanning pulse signal to the memory 107. The memory 107 transfers, to the processor 109, the N signal and the A+B image signal corresponding to an address (column) selected by the horizontal scanning pulse signal. When this operation is repeatedly performed (horizontal scanning is performed) from the 0th column to the mth column while changing the address selected by the horizontal scanning pulse signal, the N signals and the A+B image signals for one row as a readout target row can be read out.

As described above, it is possible to read out the A image signals for one row as a readout target row, the N signals corresponding to the A image signals, the A+B image signals, and the N signals corresponding to the A+B image signals.

The processor 109 performs processing of subtracting, from the A image signal, the N signal corresponding to the A image signal, thereby suppressing noise to be superimposed on the A image signal. Furthermore, the processor 109 performs processing of subtracting, from the A+B image signal, the N signal corresponding to the A+B image signal, thereby suppressing noise to be superimposed on the A+B image signal. The B image signal necessary to perform focus detection can be obtained by subtracting the A image signal from the A+B image signal.

After that, the vertical scanning circuit 103 cancels selection of the nth row by controlling the control signal PSEL(n) of the nth row from high level to low level, completes the readout operation for one row of the focus detection data row, and shifts to the readout operation of the next row.

When reading out pixel signals from the pixels 102 of the captured image data row, A+B image signals are read out, as shown in FIG. 3. On the other hand, when reading out pixel signals from the pixels 102 of the focus detection data row, A image signals and A+B image signals are read out from the same row, as shown in FIG. 4.

Figure 5:
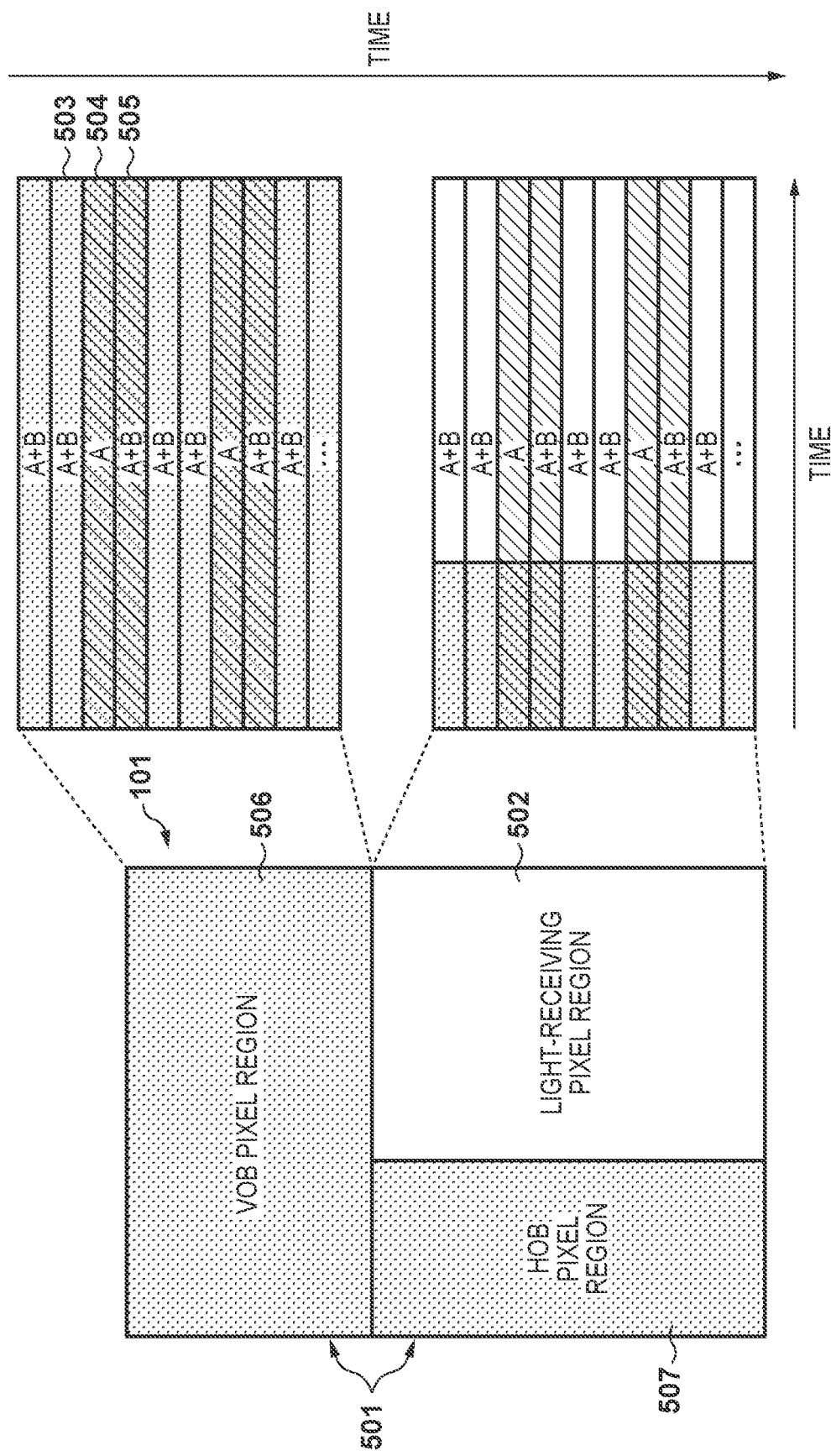
FIG. 5 is a view showing an overview of output signals of the photoelectric conversion apparatus shown in FIG. 1.

FIG. 5 is a view for conceptually explaining the readout operation in the photoelectric conversion apparatus 100 according to this embodiment. FIG. 5 shows an example of the arrangement of the pixel array 101 on the left side. FIG. 5 shows, on the right side, a conceptual view showing, from the left side in the output order, signals output from the photoelectric conversion apparatus 100 while starting a new line with reference to the horizontal synchronization signal SYNC. The width in the horizontal direction on the right side of FIG. 5 corresponds to the length of one horizontal period defined by the interval of the horizontal synchronization signal SYNC.

The plurality of pixels 102 forming the pixel array 101 include light-receiving pixels in each of which the photodiodes PDA and PDB are not shielded from light and optical black (OB) pixels in each of which the photodiodes PDA and PDB are shielded from light. In the pixel array 101, a region where the light-receiving pixels are arranged is a light-receiving pixel region 502, and a region where the OB pixels are arranged is a reference pixel region (also called an optical black region) 501. Referring to FIG. 5, a dot pattern is applied to the reference pixel region 501 so as to visually, readily discriminate between the reference pixel region 501 and the light-receiving pixel region 502. An arbitrary region can be set in the reference pixel region 501, and the set region can be used to generate a correction value (clamp value) to be used in correction processing for the output data of the light-receiving pixels. This region will be referred to as a clamp value acquisition region hereinafter.

In the reference pixel region 501, a region contacting the upper side of the pixel array 101 will be referred to as a VOB pixel region 506 hereinafter, and a region contacting the left side of the pixel array 101 will be referred to as an HOB pixel region 507 hereinafter. The VOB pixel region 506 is a region including the OB pixels arranged in rows different from rows in which the light-receiving pixels are arranged in the light-receiving pixel region 502. The HOB pixel region 507 is a region including the OB pixels arranged in columns different from columns in which the light-receiving pixels are arranged in the light-receiving pixel region 502. In one example, the clamp value acquisition region is set in some rows of the VOB pixel region 506.

On the right side of FIG. 5, a breakdown of the pixel signals read out from the pixel array 101 is shown. Referring to FIG. 5, to visually, readily discriminate between the signals read out from the captured image data row and the signals read out from the focus detection data row, the signals read out from the focus detection data row are hatched. For example, the A+B image signals are output from a given captured image data row of the pixel array 101 during a horizontal period 503 in accordance with a timing shown in FIG. 3. Furthermore, the A image signals are output during a horizontal period 504 and the A+B image signals are output during a horizontal period 505 from a given focus detection data row of the pixel array 101 in accordance with the timings shown in FIG. 4. As described above, in the readout operation of the photoelectric conversion apparatus 100 according to this embodiment, the focus detection data are discretely output while the captured image data are output.

Signal processing performed by the processor 109 will be described next. The processor 109 first performs processing of subtracting, from the A+B image signal, the N signal corresponding to the A+B image signal. This suppresses noise from the A+B image signal. Next, general-purpose correction processing (to be described later) is performed for the A+B image signal from which noise has been suppressed. After that, processing of subtracting the clamp value generated from the reference pixel region 501 is performed. The processing of subtracting the clamp value is correction processing of setting the black level in accordance with the reference level.

Figure 6:
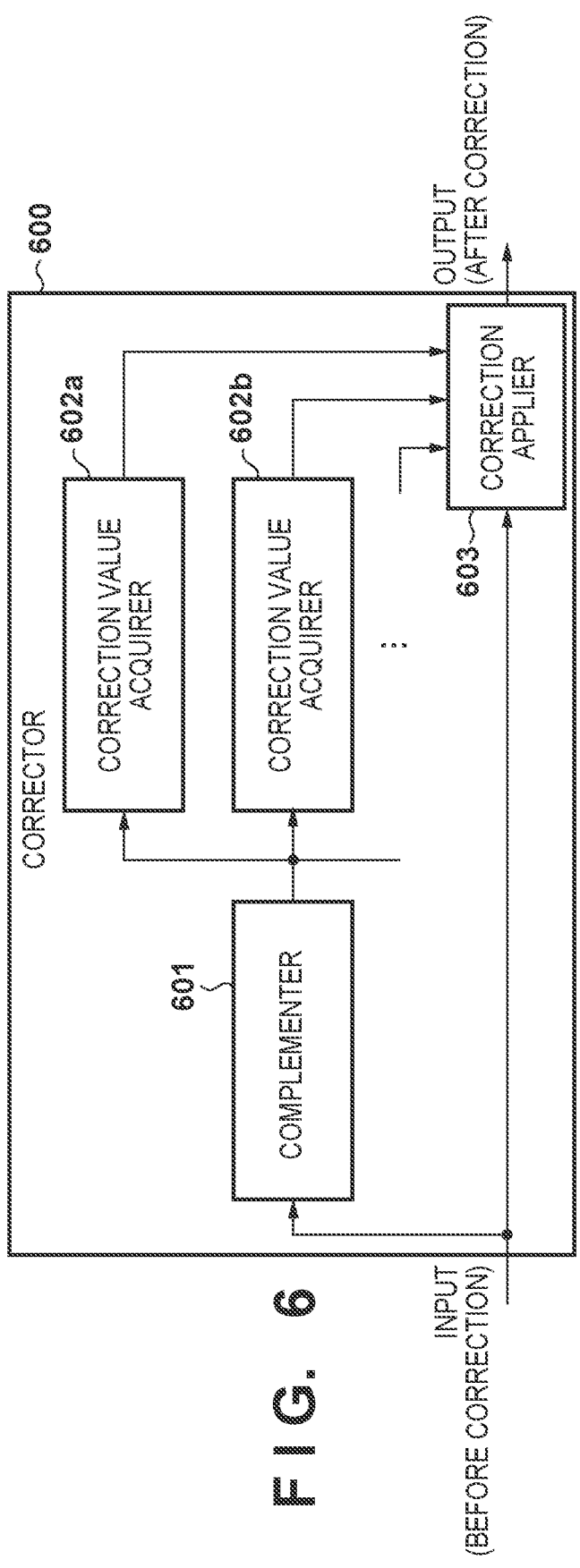
FIG. 6 is a block diagram showing an example of the arrangement of a corrector of the photoelectric conversion apparatus shown in FIG. 1.

FIG. 6 is a block diagram showing an example of the arrangement of a corrector 600 arranged in the processor 109 to perform the general-purpose correction processing in the photoelectric conversion apparatus 100 according to this embodiment. The corrector 600 including a complementer 601, a correction value acquirer 602, and a correction applier 603 performs the general-purpose correction processing for a signal input to the corrector 600. The function of the processor 109 including the corrector 600 may be implemented when the CPU or MPU reads out a program and executes it, or may be implemented by a circuit for implementing the function of an ASIC, an FPGA, or the like.

To prevent a signal (to be referred to as flaw data hereinafter) having an outlier due to a failure or sudden noise from influencing the general-purpose correction processing (to be described later), the complementer 601 replaces the value of the flaw data by a reference value. For example, the complementer 601 can detect, as flaw data, signal data exceeding a predetermined threshold among the signals output from the pixel array 101 and input to the corrector 600. As the reference value, for example, an average value or a median within a predetermined region can be used.

The correction value acquirer 602 generates a correction value from a signal output from the region of the pixel array 101, which has been designated to generate the correction value. As shown in FIG. 6, a plurality of correction value acquirers 602a and 602b may be arranged in the corrector 600. If the plurality of correction value acquirers 602a and 602b are arranged in the corrector 600, each of the plurality of correction value acquirers 602a and 602b can individually obtain a correction value. The correction applier 603 corrects the signal read out from the pixel array 101 based on the correction value generated by the correction value acquirer 602.

Figure 7:
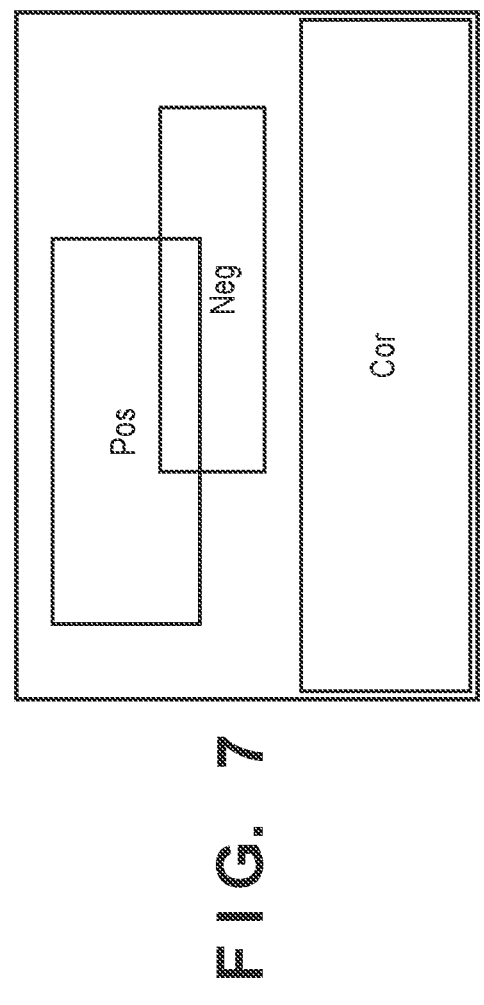
FIG. 7 is a view showing an example of the positions of pixel groups used to generate a correction value in the photoelectric conversion apparatus shown in FIG. 1.

A case in which each pixel 102 is driven in a driving mode of outputting captured image data (A+B image signal) and a driving mode of outputting focus detection data (A image signal and A+B image signal), as described above, will be exemplified below. FIG. 7 is a view showing examples of regions Pos and Neg of the pixel array 101 which have been designated to generate a correction value, and a region Cor of the pixel array which has been designated to apply the correction value. The regions Pos and Neg may be designated to partially overlap each other, as shown in FIG. 7, or different places or the same place may be designated as the regions Pos and Neg. Each of the regions Pos, Neg, and Cor may be designated appropriately by the user, or may be set by a region controller 701 (to be described later) in accordance with image capturing parameters (a driving mode in each pixel row, an exposure time, and the setting of a gain when reading out data) set by the user.

The correction value acquirer 602 will be described in detail with reference to FIG. 8. The correction value acquirer 602 includes the region controller 701, representative value generators 702 and 703, and a correction value generator 704. Based on the driving mode set for each pixel among the plurality of driving modes, the region controller 701 selects, from the regions Pos and Neg of the pixel array 101 which have been designated to generate a correction value, pixel groups whose signals are to be used to generate the correction value among the plurality of pixels 102.

The representative value generator 702 generates the representative value of the region Pos based on the signals read out from the pixel group selected from the region Pos. The representative value generator 703 generates the representative value of the region Neg based on the signals read out from the pixel group selected from the region Neg. Each of the representative values of the regions Pos and Neg can be, for example, the average value or median of the signals read out from the pixel group selected from each of the regions Pos and Neg.

The correction value generator 704 generates a correction value in accordance with the representative values of the regions Pos and Neg. For example, the correction value generator 704 may calculate, as a correction value, the difference between the representative values of the regions Pos and Neg. Alternatively, for example, the correction value generator 704 may generate a correction value by performing adjustment calculation, for example, by multiplying the difference between the representative values of the regions Pos and Neg by a predetermined coefficient. The representative value generators 702 and 703 and the correction value generator 704 function, in cooperation with each other, as a correction value generation circuit that generates the representative value of the region Pos from the pixel group selected to generate the representative value of the region Pos, generates the representative value of the region Neg from the pixel group selected to generate the representative value of the region Neg, and generates a correction value in accordance with the representative values of the regions Pos and Neg.

The correction value generator 704 may include a storage 705 that stores a plurality of correction values respectively generated in a plurality of frames. The photoelectric conversion apparatus 100 can be configured to read out signals from the pixel array 101 over sequential frames. This allows the corrector 600 to apply, to the signal read out from the pixel array 101, the correction value generated in the same frame among the plurality of correction values or the correction value generated in the frame preceding by one or more frames among the plurality of correction values. As described above, the storage 705 functions as a storage that stores the plurality of correction values respectively generated in the plurality of frames.

Figure 8:
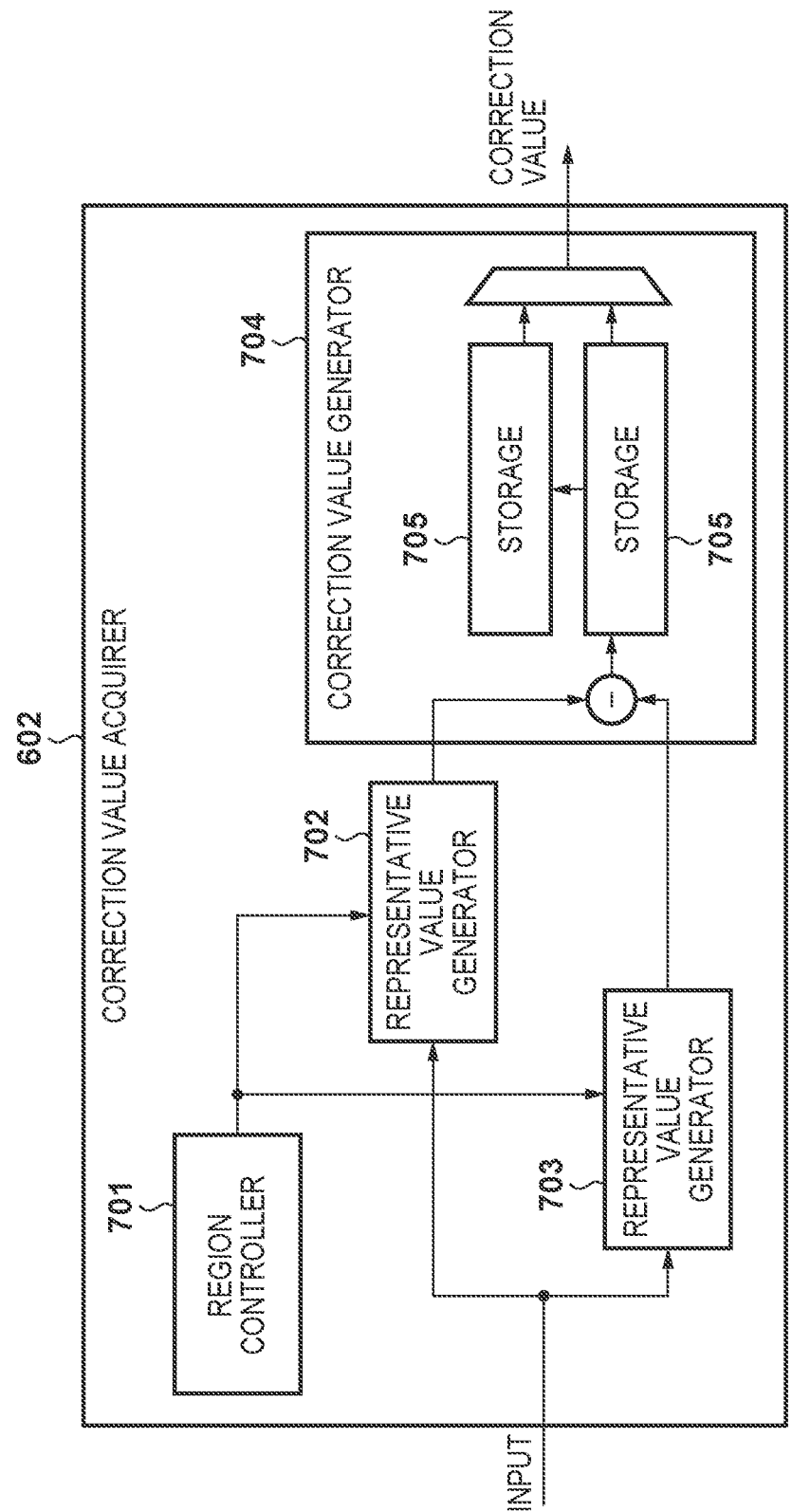
FIG. 8 is a block diagram showing an example of the arrangement of a correction value acquirer of the photoelectric conversion apparatus shown in FIG. 1.

For example, as shown in FIG. 8, the correction value acquirer 602 may include two storages 705 each of which stores correction values, and one of the correction value acquired from the signal of the current frame and the correction value acquired from the signal of the immediately preceding frame may be applicable to the signal output from the pixel array 101. For example, based on the settings of the image capturing parameters and the like, the correction value acquired in a specific frame can be selected as a correction value to be output.

Figure 9:
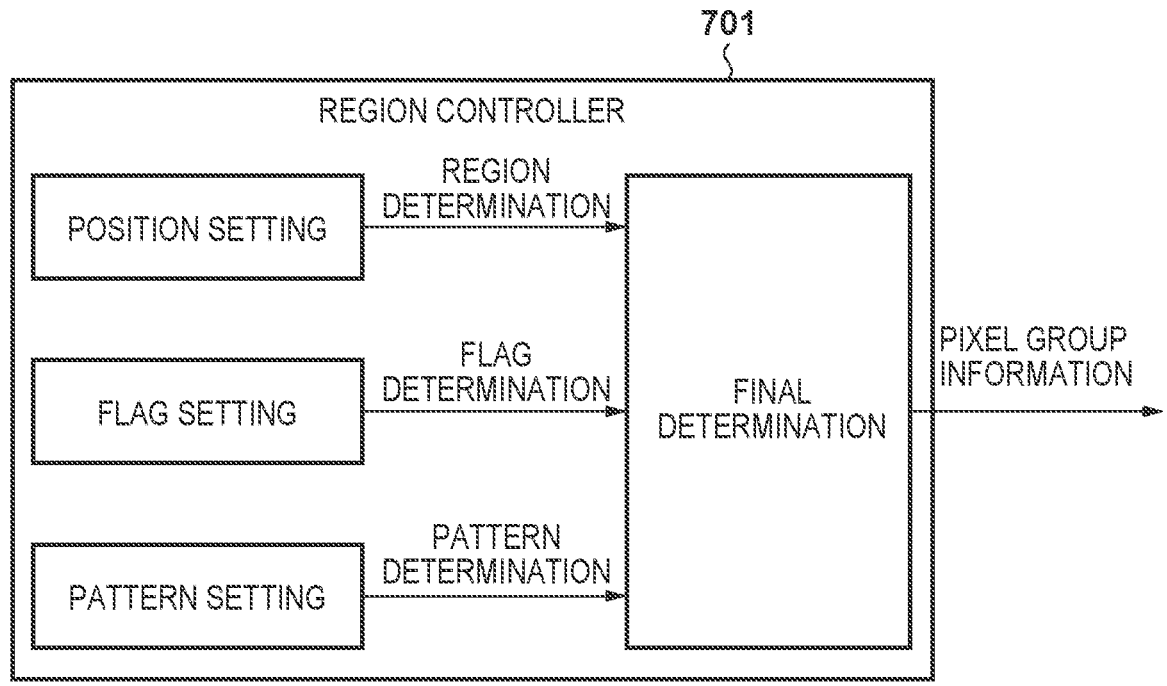
FIG. 9 is a view showing an example of the arrangement of a region controller of the photoelectric conversion apparatus shown in FIG. 1.

The region controller 701 will be described with reference to FIG. 9. The region controller 701 selects, from the region Pos, a pixel group to generate the representative value of the region Pos by combining a position setting and a flag setting.

Similarly, the region controller 701 selects, from the region Neg, a pixel group to generate the representative value of the region Neg by combining a position setting and a flag setting.

The position setting determines a region based on the coordinate position, in the pixel array 101, of the pixel 102 which has output the signal. For example, a rectangular region is designated (the start and end in the vertical and horizontal directions are designated) in the pixel array 101, and it is determined that the signal output from the pixel 102 in the region is a signal output from the region Pos or Neg.

The flag setting determines whether a flag (metadata) input in addition to the signal output from the pixel 102 matches a predetermined value. For example, the region controller 701 selects, as a pixel group to generate each of the representative values of the regions Pos and Neg, a signal whose flag matches the predetermined value. The flag is used to identify the characteristic of the signal such as the driving mode of the pixel 102. For example, the flag may be a signal indicating whether the signal is an A image signal or an A+B image signal. Alternatively, for example, the flag may be a signal indicating whether the signal is the signal of the pixel 102 of the row read out in a focus detection driving mode or the signal of the pixel 102 of the row read out in a captured image driving mode. For example, the flag may be a signal for identifying a gain in each driving mode, for example, may output a different gain for one pixel output. For example, the flag may be a signal indicating whether the signal is output from the pixel of the VOB pixel region 506, the HOB pixel region 507, or the light-receiving pixel region 502. Examples of the flag are a signal indicating whether the current time is in a vertical blanking interval, and a frame number. Furthermore, the driving mode of a surrounding pixel (for example, whether the pixel is adjacent to a focus detection pixel) may be included as the flag in addition to the corresponding pixel.

By combining the position setting and the flag setting, the region controller 701 finally determines the pixels 102 forming the pixel group to generate each of the representative values of the regions Pos and Neg among the plurality of pixels 102 arranged in the pixel array 101. For example, the position of the region Pos of the pixel array 101 is determined by the position setting, and a pixel group to generate the representative value of the region Pos formed by the pixels 102 from which the signals have been read out in the captured image driving mode is selected from the region Pos by the flag setting. As described above, the region controller 701 functions as a selecting circuit that selects, from the region Pos of the pixel array 101 which has been designated to generate a correction value, a pixel group to generate the representative value of the region Pos among the plurality of pixels based on the driving mode set for each pixel 102 among the plurality of driving modes.

The region controller 701 may select a pixel group to generate each of the representative values of the regions Pos and Neg by combining a pattern setting in addition to the position setting and the flag setting. As shown on the right side of FIG. 5, in the pixel array 101, the pixels 102 driven in the plurality of respective driving modes may be arranged to have a periodic pattern. The pattern setting selects a pixel group to generate each of the representative values of the regions Pos and Neg based on a predetermined periodic pattern. For example, it is possible to make a flexible setting using the pattern setting. For example, in the pattern shown in FIG. 5, rows before and after the pixel row in which the signals are read out in the focus detection driving mode can be selected as a pixel group to generate each of the representative values of the regions Pos and Neg.

Next, the correction applier 603 will be described with reference to FIG. 10. The correction applier 603 includes a region controller 801 and an applier 802. The region controller 801 can have the same arrangement as that of the region controller 701. Based on the driving mode set for each pixel 102 among the plurality of driving modes, the region controller 801 selects, from the designated region Cor of the pixel array 101, among the plurality of pixels 102, a pixel group to which the correction value generated by the correction value acquirer 602 is to be applied. As described above, by combining the position setting, the flag setting, the pattern setting, and the like, the region controller 801 selects a pixel group formed by the pixels arranged in the region Cor, to which the correction value is to be applied.

The applier 802 applies the correction value to each of the signals output from the pixels 102 forming the pixel group selected by the region controller 801. For example, the applier 802 may perform, for the signal output from each pixel 102 selected by the region controller 801, correction using the four arithmetic operations by performing, for example, addition, subtraction, multiplication, or division of the correction value generated by the correction value acquirer 602. For example, the correction value generator 704 generates the correction value based on the difference between the representative values of the regions Pos and Neg. In this case, the applier 802 may add the correction value to the signal read out from each pixel 102 selected by the region controller 801. Alternatively, for example, the correction value generator 704 generates the correction value based on the ratio between the representative values of the regions Pos and Neg. In this case, the applier 802 can correct the gain component by multiplication of the correction value. As described above, the correction applier 603 functions as a correcting circuit that corrects, based on the correction value, the signal read out from the pixel array 101.

The applier 802 of the correction applier 603 need not apply the correction value to the signal read out from a pixel other than the pixel group selected by the region controller 801. For example, among the signals read out from the pixel array 101, a signal read out from a pixel other than the pixel group selected by the region controller 801 may be output without undergoing the general-purpose correction processing.

Figure 10:
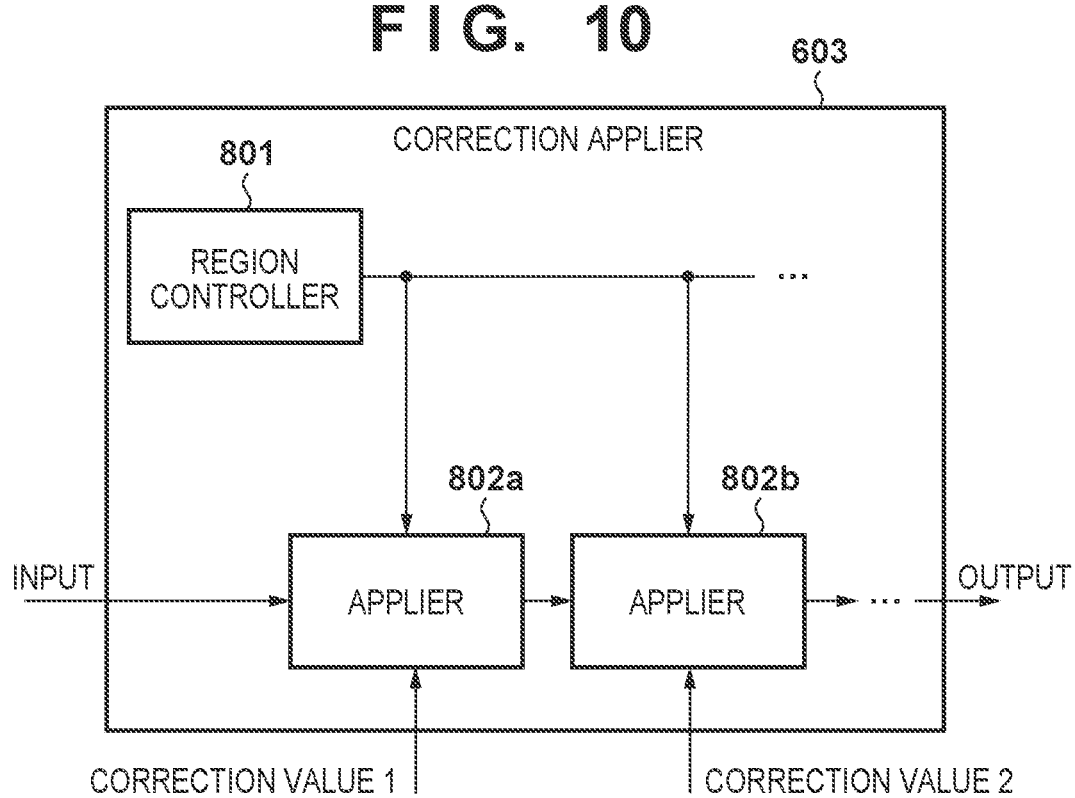
FIG. 10 is a block diagram showing an example of the arrangement of a correction applier of the photoelectric conversion apparatus shown in FIG. 1.

If there exist the plurality of correction value acquirers 602, as shown in FIG. 6, the plurality of appliers 802a and 802b can be arranged in correspondence with the correction value acquirers 602, respectively, as shown in FIG. 10. The result of sequentially applying correction values 1 and 2 by the plurality of appliers 802a and 802b is output from the correction applier 603. In this case, a pixel group to which the correction value is applied can individually be set for each of correction values 1 and 2. If correction is performed for all the signals output from the pixel array 101, the region controller 801 need not be arranged.

FIGS. 11A and 11B each show an example of the general-purpose correction processing in the corrector 600 according to this embodiment. For example, consider a case in which a correction value is obtained from the difference between the focus detection data and the captured image data in the VOB pixel region 506, and is used to correct the focus detection data in the light-receiving pixel region 502. In this case, as shown in FIG. 11A, as selection of a pixel group to generate the representative value of the region Pos, the VOB pixel region 506 is set as the position setting and a signal read out in the captured image driving mode is set as the flag setting. This selects, as a pixel group to generate the representative value of the region Pos, a pixel group formed by the pixels 102 arranged in the VOB pixel region 506 and the captured image data row. Furthermore, as selection of a pixel group to generate the representative value of the region Neg, the VOB pixel region 506 is set as the position setting, and a signal read out in the focus detection driving mode is set as the flag setting. This selects, as a pixel group to generate the representative value of the region Neg, a pixel group formed by the pixels 102 arranged in the VOB pixel region 506 and the focus detection data row. As described above, the pixel group to generate the representative value of the region Pos and the pixel group to generate the representative value of the region Neg may be formed by the pixels 102 arranged in the reference pixel region 501 (optical black region) among the plurality of pixels 102.

As selection of a pixel group to which the correction value generated in accordance with the representative values of the regions Pos and Neg is to be applied, the light-receiving pixel region 502 is set as the position setting and a signal read out in the focus detection driving mode is set as the flag setting. This selects, as a pixel group to which the correction value is to be applied, a pixel group formed by the pixels 102 arranged in the light-receiving pixel region 502 and the focus detection data row. Furthermore, if, as shown in FIG. 8, the correction value acquirer 602 includes the two storages 705 each of which stores correction values, the correction value acquired from a signal generated in the same frame can be applied to each of the signals read out from the pixel group formed by the pixels 102 arranged in the light-receiving pixel region 502 and the focus detection data row.

For example, vertical shading may be large and the offset amount between the VOB pixel region 506 and the light-receiving pixel region 502 may be different. In this case, as shown in FIG. 11B, as selection of a pixel group to generate the representative value of the regions Pos, the HOB pixel region 507 is set as the position setting and a signal read out in the captured image driving mode is set as the flag setting. This selects, as a pixel group to generate the representative value of the region Pos, a pixel group formed by the pixels 102 arranged in the HOB pixel region 507 and the captured image data row. Furthermore, as selection of a pixel group to generate the representative value of the region Neg, the HOB pixel region 507 is set as the position setting and a signal read out in the focus detection driving mode is set as the flag setting. This selects, as a pixel group to generate the representative value of the region Neg, a pixel group formed by the pixels 102 arranged in the HOB pixel region 507 and the focus detection data row.

As selection of a pixel group to which the correction value generated in accordance with the representative values of the regions Pos and Neg is to be applied, the pixel array 101 is set as the position setting and a signal read out in the focus detection driving mode is set as the flag setting. This selects, as a pixel group to which the correction value is to be applied, a pixel group formed by the pixels 102 arranged in the pixel array 101 and the focus detection data row. If, as shown in FIG. 8, the correction value acquirer 602 incudes the two storages 705 each of which stores correction values, the correction value acquired from a signal generated in the immediately preceding frame can be applied to each of the signals read out from the pixel group formed by the pixels 102 arranged in the light-receiving pixel region 502 and the focus detection data row.

As described above, the photoelectric conversion apparatus 100 including the corrector 600 for performing the general-purpose correction processing according to this embodiment can flexibly control the position settings of the regions Pos and Neg to generate the representative values of the regions Pos and Neg. This can implement the general-purpose correction processing that can cope with the various driving modes and the arrangement pattern of the pixel rows operating in the respective driving modes.

Next, a method of applying the above-described general-purpose correction processing to a case in which the correction value is not uniform in the pixel array 101 will be described. In the photoelectric conversion apparatus 100, if correction values are ideally, directly measured at all the coordinate positions, the accuracy of the correction processing is high. However, since calculation cost for acquiring the correction values is high, a correction value (interpolated correction value) at each coordinate position is obtained by interpolation from discretely measured correction values.

Figure 12:
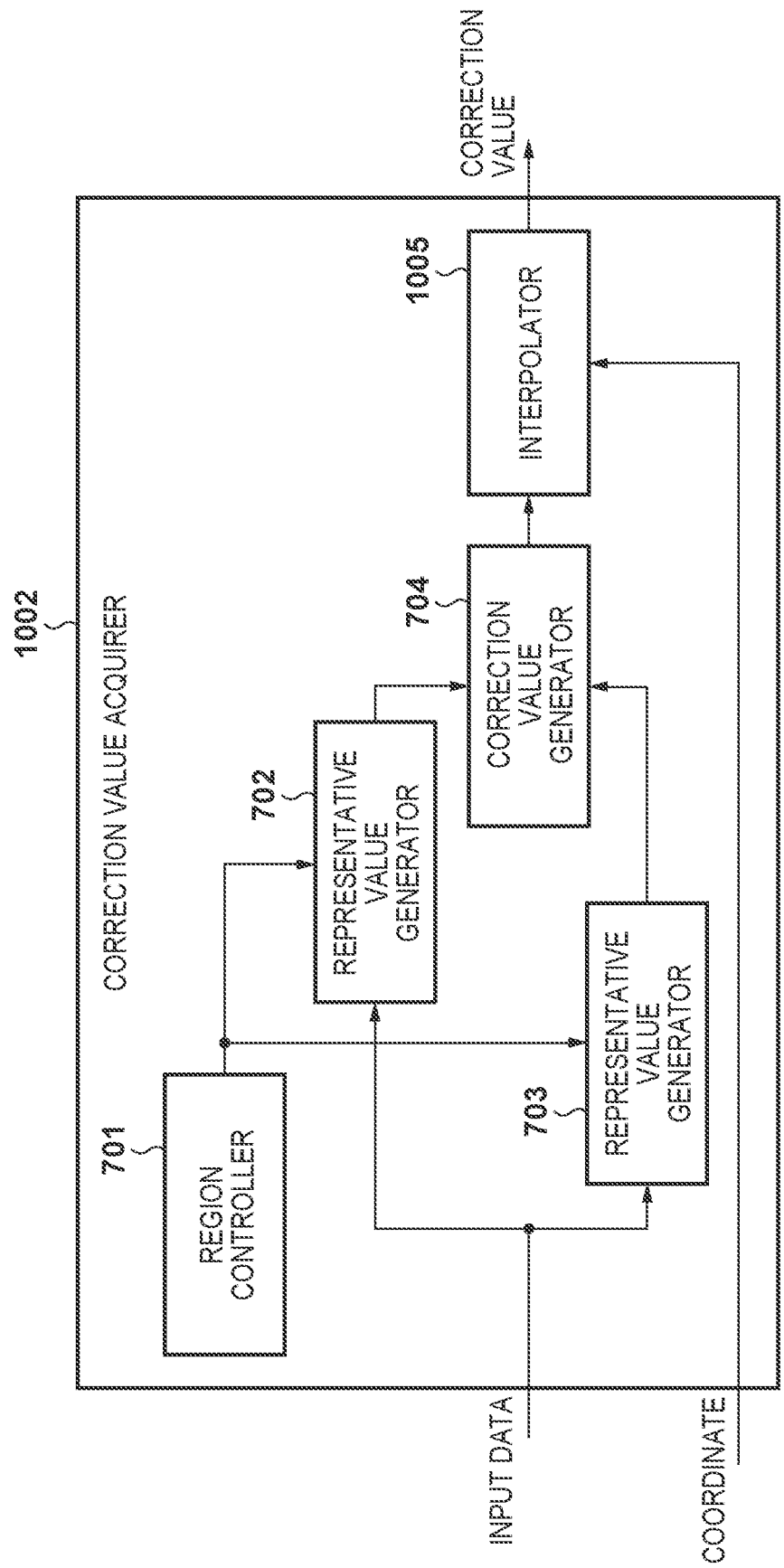
FIG. 12 is a block diagram showing an example of the arrangement of a correction value acquirer of the photoelectric conversion apparatus shown in FIG. 1.

FIG. 12 shows the arrangement of a correction value acquirer 1002 as a modification of the correction value acquirer 602 shown in FIG. 8. As compared with the correction value acquirer 602 shown in FIG. 8, the correction value acquirer 1002 shown in FIG. 12 is added with an interpolator 1005. The components of the photoelectric conversion apparatus 100 other than the correction value acquirer 1002 including the interpolator 1005 are the same as those described above. Thus, the correction value acquirer 1002 will mainly be described.

Furthermore, the operation of the photoelectric conversion apparatus 100 including the correction value acquirer 1002 will be described by assuming that a frame in which correction values are generated and a frame in which correction values are applied are different frames. For example, the region controller 701, the representative value generators 702 and 703, and the correction value generator 704 operate in a frame in which correction values are generated, and the interpolator 1005 operates in a frame in which the correction applier 603 applies correction values to signals read out from the pixel array 101. As the frame in which the correction values are generated, a frame in which normal image capturing is performed may be used. For example, a correction value may be generated using a correction value generation frame in which a signal is read out from the pixel array 101 in a state in which light is shielded or a state in which the control signals PTXA and PTXB are fixed at low level.

Figure 13A:
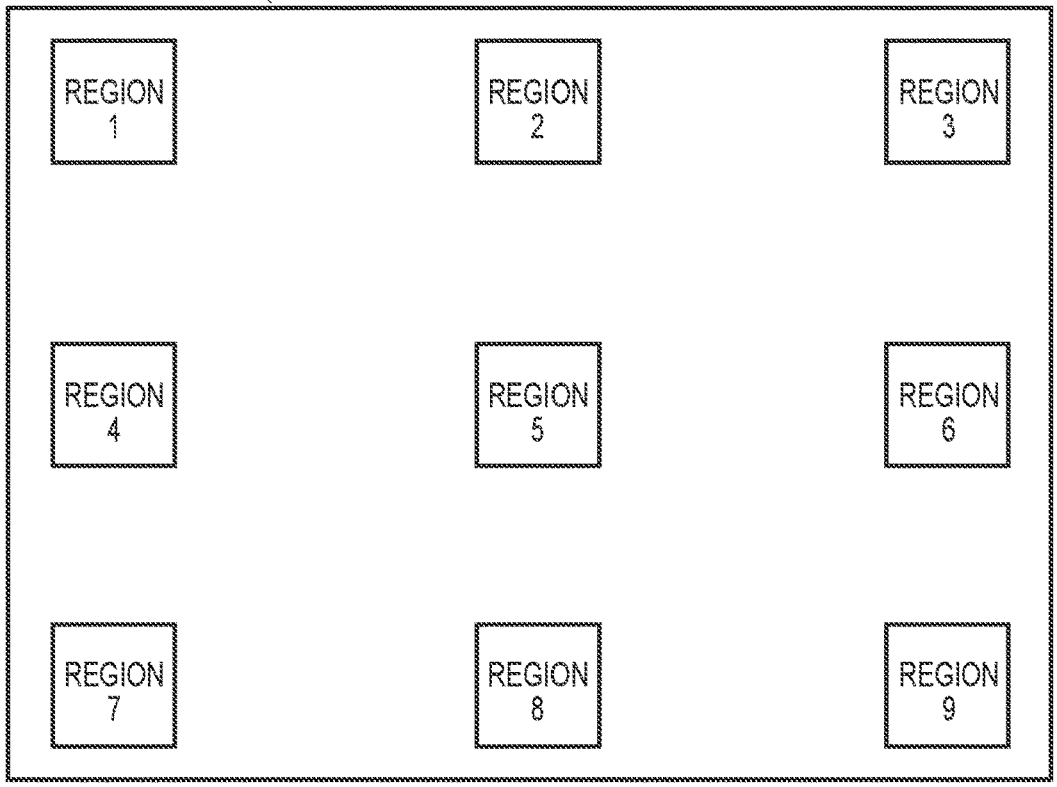
FIGS. 13A and 13B are views each showing examples of the positions of pixel groups used to generate a correction value in the photoelectric conversion apparatus shown in FIG. 1.
Figure 13B:
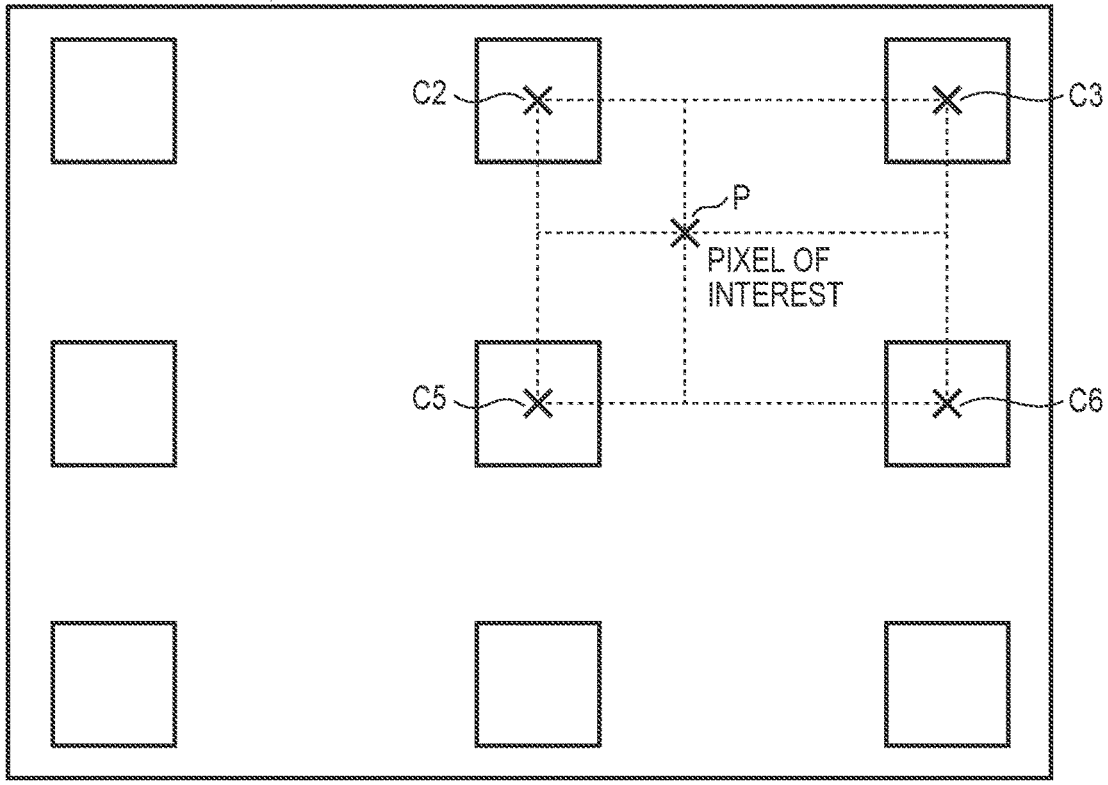

First, the operation in the frame in which the correction values are generated will be described. The region controller 701 sets a plurality of regions Pos and a plurality of regions Neg in the position setting, and determines that the signals output from the pixels 102 in the plurality of regions are signals output from the regions Pos and Neg. For example, the regions Pos and Neg can be set in nine regions 1 to 9 shown in FIG. 13A in one frame. The first regions Pos and Neg are set in region 1 shown in FIG. 13A, the second regions Pos and Neg are set in region 2 shown in FIG. 13A, and the ninth regions Pos and Neg are set in region 9 shown in FIG. 13A. In combination with the flag setting, for example, a pixel group formed by the pixels 102 from which the signals are read out in the captured image driving mode is selected from region 1 set as the region Pos. Furthermore, for example, a pixel group formed by the pixels 102 from which the signals are read out in the focus detection driving mode is selected from region 1 set as the region Neg. Similarly, a pixel group to generate each of the representative values of the regions Pos and Neg is selected from each of regions 2 to 9. That is, as shown in FIG. 13A, pixel groups to generate the representative values of the regions Pos and Neg are arranged over the plurality of regions of the pixel array 101.

Next, the representative value generator 702 generates the representative values of the regions Pos and Neg of each of regions 1 to 9. The correction value generator 704 generates the correction value of each of regions 1 to 9 in accordance with the representative values of the regions Pos and Neg of each of regions 1 to 9 using the representative values of the regions Pos and Neg of each of regions 1 to 9. For example, as described above, the correction value generator 704 generates, as a correction value, the difference or ratio between the representative values of the regions Pos and Neg. This generates a plurality of correction values in correspondence with the plurality of regions 1 to 9 shown in FIG. 13A in the frame in which the correction values are generated.

Next, the operation in the frame in which correction values are applied will be described. The interpolator 1005 functions as an interpolation circuit that generates an interpolated correction value corresponding to the position of each of the plurality of pixels 102 in the pixel array 101 based on the positions of the plurality of regions 1 to 9 in the pixel array 101 and the plurality of correction values. For example, based on the correction values of regions 1 to 9 and the barycentric positions of regions 1 to 9 in the pixel array 101, and the coordinate position of each pixel 102, the interpolator 1005 obtains an interpolated correction value for each pixel 102 by interpolation processing. As shown in, for example, FIG. 13B, the interpolation processing may obtain a correction value by bilinear interpolation from barycentric positions C2, C3, C5, and C6 of four regions 2, 3, 5, and 6 surrounding a coordinate position P of the pixel 102 of interest. The number of regions and the interpolation method when performing interpolation processing are not limited to the above ones. The interpolator 1005 may generate an interpolated correction value from the correction value of an arbitrary region by predetermined curve approximation. Alternatively, the interpolator 1005 may generate an interpolated correction value using extrapolation in addition to the interpolation shown in FIG. 13B.

After the interpolated correction value corresponding to each of the pixels 102 arranged in the pixel array 101 is generated, the correction applier 603 performs correction by applying the interpolated correction values to the signals read out from the pixel array 101. In the frame in which the correction values are applied, new correction values to be used for correction in the next frame may be generated and acquired.

As described above, even if the correction value is not uniform in the plane of the pixel array 101, the accuracy of the correction processing can be improved. In this case as well, the photoelectric conversion apparatus 100 including the corrector 600 for performing the general-purpose correction processing according to this embodiment can flexibly control the position settings of the regions Pos and Neg to generate the representative values of the regions Pos and Neg. This can implement the general-purpose correction processing that can cope with the various driving modes and the arrangement pattern of the pixel rows operating in the respective driving modes.

In each of the above-described embodiments, a case in which the signals are read out from the pixels 102 arranged in the pixel array 101 in the captured image driving mode of acquiring the A+B image signal and the focus detection driving mode of acquiring the A image signal and the A+B image signal has been explained. However, application of the general-purpose correction processing is not limited to this, and the general-purpose correction processing can be applied to a case in which the plurality of pixels 102 arranged in the pixel array 101 are configured to be operable in the plurality of driving modes in which different signal readout methods are used. For example, to expand the dynamic range of an image obtained by the photoelectric conversion apparatus 100, a gain when reading out the signals may be changed depending on the pixel row of the pixel array 101 or the exposure time (accumulation time) may be changed depending on the pixel row of the pixel array 101. Furthermore, for example, to improve the readout speed of the photoelectric conversion apparatus 100, the signals may be simultaneously read out from a plurality of pixel rows or a pixel row from which the signals are read out and a pixel row from which no signals are read out may be mixed. If the plurality of driving modes are provided to read out the signals from the pixels 102, it is possible to freely designate the positions of the regions Pos and Neg by arranging the region controller 701 in the corrector 600, as described above. This copes with the various driving modes, and it is thus possible to perform the correction processing accurately.

Furthermore, in accordance with the type of driving mode and a request for the accuracy of the correction processing, the region controller 701 may select one pixel group from one region in the pixel array 101 based on the driving mode set for each pixel among the plurality of driving modes, and generate a correction value. Even in this case, it is possible to freely designate a region to generate a correction value, and perform the correction processing accurately in accordance with the various driving modes.

Figure 14:
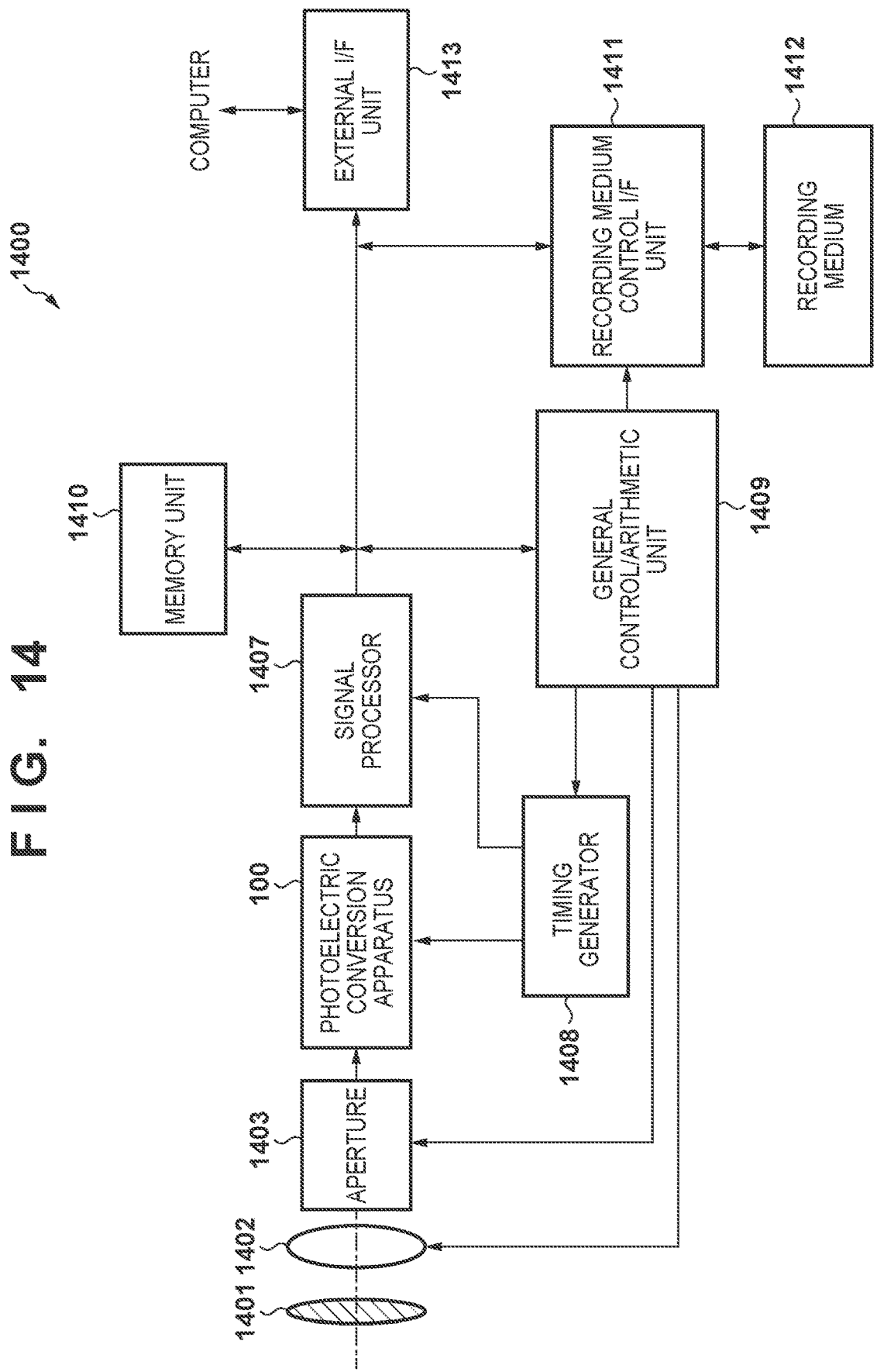
FIG. 14 is a block diagram showing an example of the configuration of an image capturing system incorporating the photoelectric conversion apparatus shown in FIG. 1.

An application example of the photoelectric conversion apparatus 100 according to this embodiment will now be described. FIG. 14 is a block diagram showing the schematic configuration of a photoelectric conversion system 1400 incorporating the photoelectric conversion apparatus 100.

The above-described photoelectric conversion apparatus 100 of this embodiment can be applied to various kinds of photoelectric conversion systems. Examples of photoelectric conversion systems to which the photoelectric conversion apparatus is applicable are a digital still camera, a digital camcorder, a monitoring camera, a copying machine, a facsimile apparatus, a mobile phone, an in-vehicle camera, and an observation satellite. A camera module including an optical system such as a lens and a photoelectric conversion apparatus is also included in the photoelectric conversion systems. FIG. 14 shows the block diagram of a digital still camera as an example of these.

The photoelectric conversion system 1400 shown in FIG. 14 includes the photoelectric conversion apparatus 100, a lens 1402 that forms an optical image of an object on the photoelectric converter (for example, the pixel array 101, for example, the light-receiving pixel region 502) of the photoelectric conversion apparatus 100, an aperture 1403 configured to change the amount of light passing through the lens 1402, and a barrier 1401 configured to protect the lens 1402. The lens 1402 and the aperture 1403 form an optical system that condenses light to the photoelectric conversion apparatus 100. The photoelectric conversion apparatus 100 converts the optical image formed by the lens 1402 into an electrical signal.

The photoelectric conversion system 1400 also includes a signal processor 1407 that is an image generator configured to generate an image by processing an output signal output from the photoelectric conversion apparatus 100. The signal processor 1407 performs an operation of performing various kinds of correction and compression as needed, thereby outputting image data. The signal processor 1407 may be formed on a semiconductor substrate on which the photoelectric conversion apparatus 100 is provided or may be formed on a semiconductor substrate different from the photoelectric conversion apparatus 100. In addition, the photoelectric conversion apparatus 100 and the signal processor 1407 may be formed on the same semiconductor substrate.

The photoelectric conversion system 1400 further includes a memory unit 1410 configured to temporarily store image data, and an external interface unit (external I/F unit) 1413 configured to communicate with an external computer or the like. Furthermore, the photoelectric conversion system 1400 includes a recording medium 1412 such as a semiconductor memory configured to record or read image capturing data, and a recording medium control interface unit (recording medium control I/F unit) 1411 configured to perform record or read for the recording medium 1412. Note that the recording medium 1412 may be incorporated in the photoelectric conversion system 1400 or may be detachable.

Furthermore, the photoelectric conversion system 1400 includes a general control/arithmetic unit 1409 that controls various kinds of operations and the entire digital still camera, and a timing generator 1408 that outputs various kinds of timing signals to the photoelectric conversion apparatus 100 and the signal processor 1407. In this example, the timing signal and the like may be input from the outside, and the photoelectric conversion system 1400 need only include at least the photoelectric conversion apparatus 100, and the signal processor 1407 that processes an output signal output from the photoelectric conversion apparatus 100.

The photoelectric conversion apparatus 100 outputs an image capturing signal to the signal processor 1407. The signal processor 1407 executes predetermined signal processing for the image capturing signal output from the photoelectric conversion apparatus 100, and outputs image data. The signal processor 1407 generates an image using the image capturing signal.

As described above, according to this embodiment, it is possible to implement the photoelectric conversion system to which the above-described photoelectric conversion apparatus 100 (for example, an image capturing apparatus) is applied.

Figure 15A:
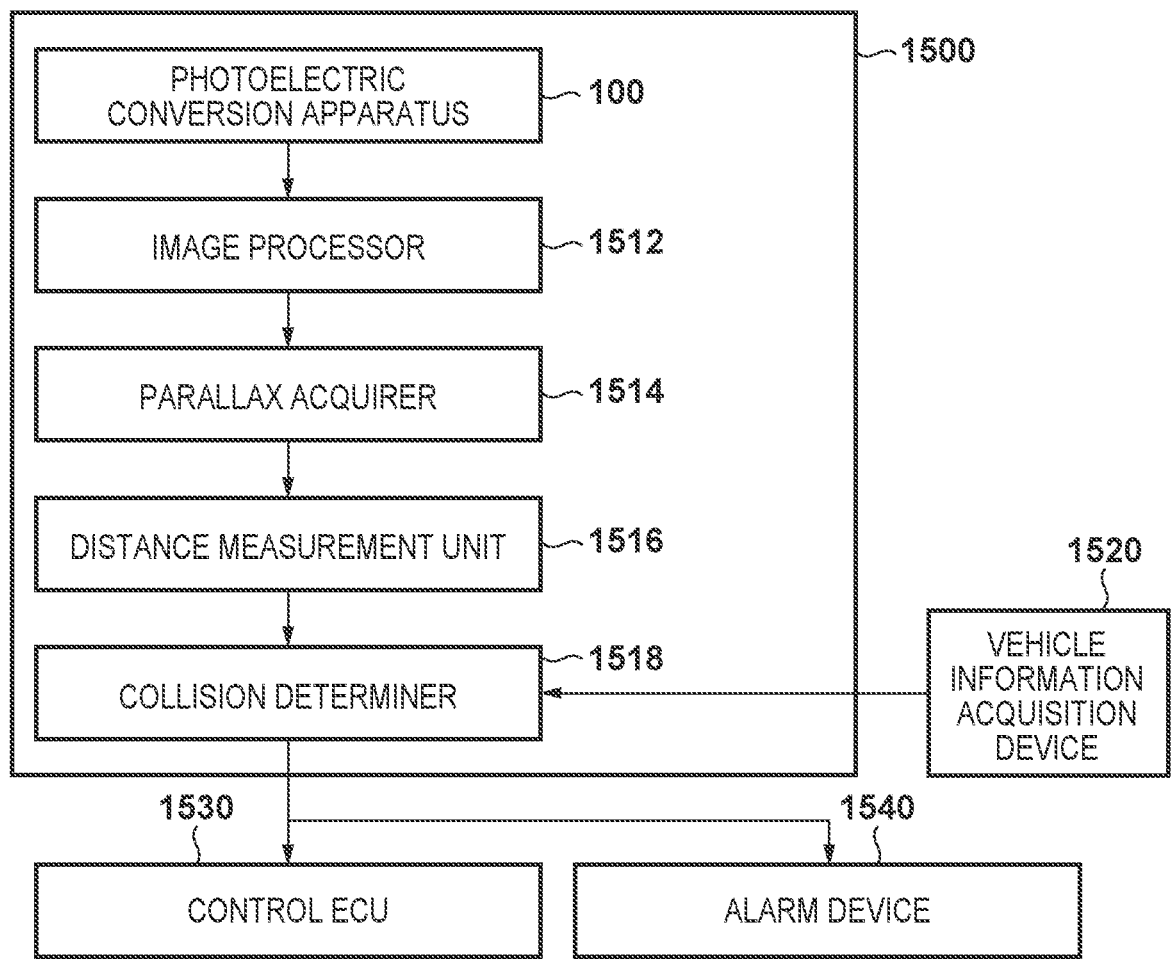
FIG. 15A is a block diagram showing an example of the configuration of a photoelectric conversion system incorporating the photoelectric conversion apparatus shown in FIG. 1.
Figure 15B:
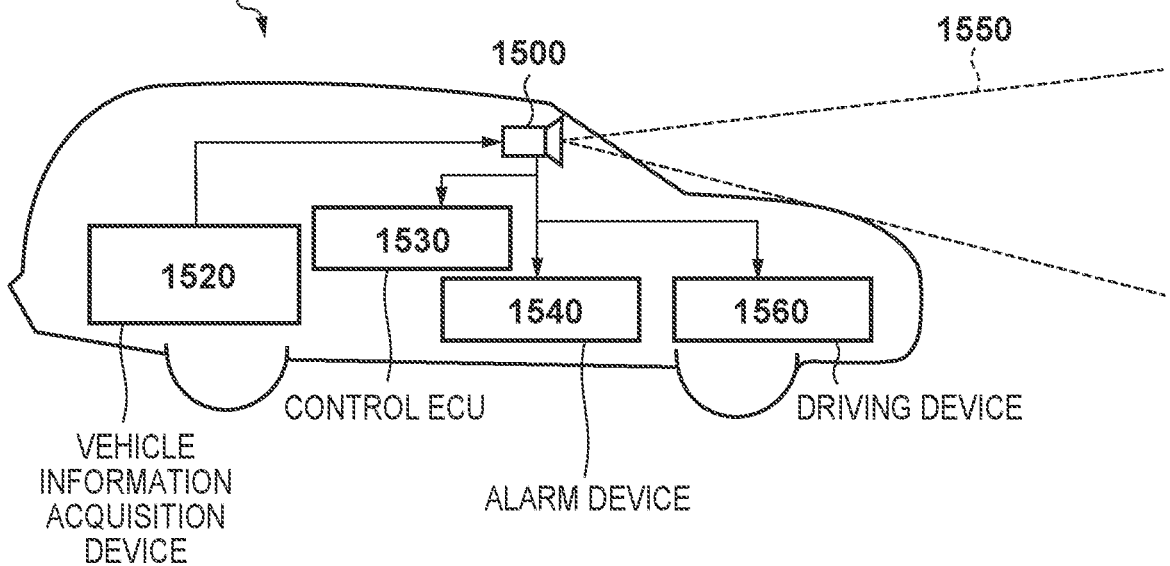
FIG. 15B is a view showing an example of the configuration of a transport apparatus incorporating the photoelectric conversion system shown in FIG. 15A.

A photoelectric conversion system incorporating the photoelectric conversion apparatus 100 of this embodiment and a transport apparatus will be described next with reference to FIGS. 15A and 15B. FIGS. 15A and 15B are block diagrams showing the configuration of a photoelectric conversion system 1500 incorporating the photoelectric conversion apparatus 100 according to this embodiment and the configuration of a transport apparatus 1501 incorporating the photoelectric conversion system 1500.

FIG. 15A shows an example of the photoelectric conversion system 1500 concerning an in-vehicle camera. The photoelectric conversion system 1500 includes an image processor 1512 that performs signal processing such as image processing for a plurality of image data acquired by the photoelectric conversion apparatus 100 of this embodiment, and a parallax acquirer 1514 that calculates a parallax (the phase difference between parallax images) from the plurality of image data that have undergone the signal processing by the image processor 1512. The photoelectric conversion system 1500 also includes a distance acquirer 1516 that calculates the distance up to a target based on the calculated parallax, and a collision determiner 1518 that determines, based on the calculated distance, whether there is collision possibility. Here, the parallax acquirer 1514 and the distance acquirer 1516 are examples of a distance information acquirer that acquires distance information up to a target. That is, the distance information is information concerning a parallax, a defocus amount, a distance up to a target, and the like. The collision determiner 1518 may determine collision possibility using one of the pieces of distance information. The distance information acquirer may be implemented by exclusively designed hardware, or may be implemented by a software module. The distance information acquirer may be implemented by an FPGA (Field Programmable Gate Array) or ASIC (Application Specific Integrated Circuit), or may be implemented by a combination of these.

The photoelectric conversion system 1500 is connected to a vehicle information acquisition device 1520 of the transport apparatus 1501 (for example, a vehicle) including a driving device, and can acquire vehicle information such as a vehicle speed, a yaw rate, and a steering angle. The photoelectric conversion system 1500 is also connected to a control ECU 1530 that is a control device configured to output a control signal for generating a braking force to the vehicle based on the determination result of the collision determiner 1518. Furthermore, the photoelectric conversion system 1500 is connected to an alarm device 1540 that generates an alarm to the driver based on the determination result of the collision determiner 1518. For example, if collision possibility is high as the determination result of the collision determiner 1518, the control ECU 1530 performs vehicle control of braking, releasing the accelerator pedal, or suppressing the engine output, thereby avoiding collision and reducing damage. The alarm device 1540 sounds an alarm, displays alarm information on the screen of a car navigation system or the like, or applies a vibration to the seat belt or a steering wheel, thereby making an alarm to the user.

In this embodiment, the periphery of the transport apparatus 1501, for example, the front or rear side is captured by the photoelectric conversion system 1500. FIG. 15B shows the photoelectric conversion system 1500 in a case in which the front side (image capturing range 1550) of the transport apparatus 1501 is captured. The vehicle information acquisition device 1520 sends an instruction to the photoelectric conversion system 1500 or the photoelectric conversion apparatus 100. With this configuration, it is possible to further improve the accuracy of distance measurement.

An example in which a driving device 1560 such as the brake, the accelerator, and the engine of the transport apparatus 1501 is controlled based on information obtained by the photoelectric conversion apparatus 100 so as not to collide with another vehicle has been described. However, the present invention is not limited to this, and the system can also be applied to control of performing automated driving following another vehicle or control of performing automated driving without deviating from a lane. Furthermore, an example in which the photoelectric conversion system 1500 incorporating the photoelectric conversion apparatus 100 is incorporated in the transport apparatus 1501 has been described. However, the photoelectric conversion apparatus 100 may be incorporated in the vehicle information acquisition device 1520, the control ECU 1530, or the alarm device 1540. The photoelectric conversion system 1500 incorporating the photoelectric conversion apparatus 100 can be applied not only to a vehicle such as an automobile but also to, for example, a transport apparatus including a driving device, such as a ship, an airplane, a railroad vehicle, or an industrial robot. In addition, the photoelectric conversion system can be applied not only to a moving body but also to an apparatus that broadly uses object recognition, such as an intelligent transport system (ITS).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-101025, filed Jun. 17, 2021, which is hereby incorporated by reference herein in its entirety.

What is claimed is:

1. A photoelectric conversion apparatus comprising a pixel array in which a plurality of pixels are arranged in a matrix, and a signal processor configured to process a signal read out from the pixel array,
    wherein the plurality of pixels are configured to be operable in a plurality of driving modes in which different signal readout methods are used, and
    the signal processor comprises:
    a selecting circuit configured to select, based on the driving mode set for each pixel among the plurality of driving modes, a first pixel group and a second pixel group among the plurality of pixels from regions of the pixel array, which have been designated to generate a correction value;
    a correction value generation circuit configured to generate the correction value in accordance with a first representative value based on signals read out from the first pixel group and a second representative value based on signals read out from the second pixel group; and
    a correcting circuit configured to correct, based on the correction value, the signal read out from the pixel array.

2. The apparatus according to claim 1, wherein
    each of the plurality of pixels includes a plurality of photoelectric converters, and
    the plurality of driving modes include a first mode in which a signal corresponding to first charges obtained by adding charges generated by the plurality of photoelectric converters is read out, and a second mode in which the signal corresponding to the first charges and a second signal corresponding to charges generated by some of the plurality of photoelectric converters are read out.

3. The apparatus according to claim 1, wherein
    each of the plurality of pixels includes a plurality of photoelectric converters,
    the plurality of driving modes include a first mode in which a signal corresponding to first charges obtained by adding charges generated by the plurality of photoelectric converters is read out, and a second mode in which the signal corresponding to the first charges and a second signal corresponding to charges generated by some of the plurality of photoelectric converters are read out,
    the first pixel group is formed by pixels that are driven in the first mode among the plurality of pixels, and
    the second pixel group is formed by pixels that are driven in the second mode among the plurality of pixels.

4. The apparatus according to claim 3, wherein the correction value generation circuit is configured to generate the correction value based on a difference between the first representative value and the second representative value.

5. The apparatus according to claim 3, wherein the correction value generation circuit is configured to generate the correction value based on a ratio between the first representative value and the second representative value.

6. The apparatus according to claim 1, wherein
the pixel array includes an optical black region that is shielded from light, and
the first pixel group and the second pixel group are formed by pixels arranged in the optical black region among the plurality of pixels.

7. The apparatus according to claim 1, wherein
in the pixel array, pixels which are driven in the plurality of respective driving modes are arranged to have a periodic pattern, and
the selecting circuit is configured to further select the first pixel group based on the periodic pattern.

8. The apparatus according to claim 1, wherein
the selecting circuit is configured to select a third pixel group among the plurality of pixels from a designated region of the pixel array based on the driving mode set for each pixel among the plurality of driving modes, and
the correcting circuit is configured to apply the correction value to a signal read out from the third pixel group.

9. The apparatus according to claim 8, wherein the correcting circuit is configured not to apply the correction value to a signal read out from a pixel group other than the third pixel group.

10. The apparatus according to claim 8, wherein
the photoelectric conversion apparatus is configured so that signals are read out from the pixel array over sequential frames,
the correction value generation circuit comprises a storage configured to store a plurality of correction values respectively generated in a plurality of frames, and
the correcting circuit is configured to apply, to the signal read out from the third pixel group, one of the correction value generated in the same frame among the plurality of correction values and the correction value generated in the frame preceding by at least one frame among the plurality of correction values.

11. The apparatus according to claim 1, wherein
the first pixel group is arranged over a plurality of regions of the pixel array,
the correction value generation circuit is configured to generate a plurality of correction values respectively corresponding to the plurality of regions,
the photoelectric conversion apparatus further comprises an interpolation circuit configured to generate an interpolated correction value corresponding to a position of each of the plurality of pixels in the pixel array based on positions of the plurality of regions in the pixel array and the plurality of correction values, and
the correcting circuit is configured to perform correction by applying the interpolated correction value to the signal read out from the pixel array.

12. A photoelectric conversion system comprising:
the photoelectric conversion apparatus according to claim 1; and
a signal processor configured to process a signal output from the photoelectric conversion apparatus.

13. A transport apparatus including a driving apparatus, comprising:
a control apparatus comprising the photoelectric conversion apparatus according to claim 1 and configured to control the driving apparatus based on information obtained by the photoelectric conversion apparatus.

14. A signal processing apparatus for processing a signal read out from a pixel array in which a plurality of pixels operable in a plurality of driving modes in which different signal readout methods are used are arranged in a matrix, comprising:
a selecting circuit configured to select, based on the driving mode set for each pixel among the plurality of driving modes, a first pixel group and a second pixel group among the plurality of pixels from regions of the pixel array of the plurality of pixels, which have been designated to generate a correction value;
a correction value generation circuit configured to generate the correction value in accordance with a first representative value based on signals read out from the first pixel group and a second representative value based on signals read out from the second pixel group; and
a correcting circuit configured to correct, based on the correction value, the signal read out from the pixel array.

* * * * *